United States Patent
Toma et al.

(10) Patent No.: US 10,547,052 B2
(45) Date of Patent: Jan. 28, 2020

(54) TRANSITION METAL-CONTAINING COMPOSITE HYDROXIDE AND MANUFACTURING METHOD THEREOF, POSITIVE ELECTRODE ACTIVE MATERIAL FOR A NON-AQUEOUS ELECTROLYTE SECONDARY BATTERY AND MANUFACTURING METHOD THEREOF, AND NON-AQUEOUS ELECTROLYTE SECONDARY BATTERY

(71) Applicant: SUMITOMO METAL MINING CO., LTD., Tokyo (JP)

(72) Inventors: Takahiro Toma, Ehime (JP); Taira Aida, Ehime (JP); Tetsufumi Komukai, Ehime (JP); Yasutaka Kamata, Ehime (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/739,216

(22) PCT Filed: Jun. 9, 2016

(86) PCT No.: PCT/JP2016/067255
§ 371 (c)(1),
(2) Date: Dec. 22, 2017

(87) PCT Pub. No.: WO2016/208413
PCT Pub. Date: Dec. 29, 2016

(65) Prior Publication Data
US 2018/0190978 A1    Jul. 5, 2018

(30) Foreign Application Priority Data

Jun. 26, 2015  (JP) .................................. 2015-129270

(51) Int. Cl.
*H01M 4/36* (2006.01)
*H01M 4/505* (2010.01)
(Continued)

(52) U.S. Cl.
CPC ............ *H01M 4/366* (2013.01); *C01G 53/50* (2013.01); *H01M 4/364* (2013.01); *H01M 4/505* (2013.01);
(Continued)

(58) Field of Classification Search
CPC ...... C01G 53/006; C01G 53/50; C01G 53/66; C01P 2002/52; C01P 2004/03;
(Continued)

(56) References Cited

U.S. PATENT DOCUMENTS

| | | |
|---|---|---|
| 2014/0011090 A1 | 1/2014 | Toya et al. |
| 2015/0364761 A1 | 12/2015 | Fukui et al. |
| 2016/0093885 A1 | 3/2016 | Kamata et al. |

FOREIGN PATENT DOCUMENTS

| | | |
|---|---|---|
| JP | 11-312519 A | 11/1999 |
| JP | 2001-354418 A | 12/2001 |

(Continued)

OTHER PUBLICATIONS

International Search Report and Written Opinion dated Sep. 13, 2016, from the corresponding PCT/JP2016/067255.

*Primary Examiner* — Carlos Barcena
(74) *Attorney, Agent, or Firm* — Katten Muchin Rosenman LLP

(57) ABSTRACT

The presently disclosed subject matter is directed to transition metal-containing composite hydroxides, their use, and manufacturing methods thereof. More particularly, the subject matter describes a positive electrode active material for a non-aqueous electrolyte secondary battery that uses a transition metal-containing composite hydroxide as a pre- (Continued)

cursor and a manufacturing method thereof. In some embodiments, the non-aqueous electrolyte secondary battery uses a positive electrode active material for a non-aqueous electrolyte secondary battery as a positive electrode material.

13 Claims, 4 Drawing Sheets

(51) Int. Cl.
    *H01M 4/525*     (2010.01)
    *H01M 10/0525*     (2010.01)
    *C01G 53/00*     (2006.01)
    *H01M 4/02*     (2006.01)

(52) U.S. Cl.
    CPC ....... *H01M 4/525* (2013.01); *H01M 10/0525* (2013.01); *C01P 2002/52* (2013.01); *C01P 2004/03* (2013.01); *C01P 2004/50* (2013.01); *C01P 2004/51* (2013.01); *C01P 2004/61* (2013.01); *C01P 2004/84* (2013.01); *C01P 2006/12* (2013.01); *C01P 2006/40* (2013.01); *H01M 2004/021* (2013.01); *H01M 2004/028* (2013.01)

(58) Field of Classification Search
    CPC .............. C01P 2004/20; C01P 2004/50; C01P 2004/51; C01P 2004/61; C01P 2004/84; C01P 2006/12; C01P 2006/40; H01M 10/052; H01M 10/0525; H01M 2004/021; H01M 2004/028; H01M 4/364; H01M 4/366; H01M 4/505; H01M 4/525
    See application file for complete search history.

(56) References Cited

FOREIGN PATENT DOCUMENTS

| | | |
|---|---|---|
| JP | 2012-246199 | 12/2012 |
| JP | 2013-144625 A | 7/2013 |
| JP | 2013-147416 A | 8/2013 |
| WO | 2012/131881 A1 | 10/2012 |
| WO | 2012/169274 A1 | 12/2012 |
| WO | 2014/181891 A1 | 11/2014 |

TRANSITION METAL-CONTAINING COMPOSITE HYDROXIDE AND MANUFACTURING METHOD THEREOF, POSITIVE ELECTRODE ACTIVE MATERIAL FOR A NON-AQUEOUS ELECTROLYTE SECONDARY BATTERY AND MANUFACTURING METHOD THEREOF, AND NON-AQUEOUS ELECTROLYTE SECONDARY BATTERY

TECHNICAL FIELD

The present invention relates to a transition metal-containing composite hydroxide and a manufacturing method thereof, a positive electrode active material for a non-aqueous electrolyte secondary battery that uses this transition metal-containing composite hydroxide as a precursor and a manufacturing method thereof, and a non-aqueous electrolyte secondary battery that uses this positive electrode active material for a non-aqueous electrolyte secondary battery as a positive electrode material.

BACKGROUND ART

In recent years, with the spread of portable electronic devices such as portable telephones, notebook personal computers and the like, there is a large need for development of compact and lightweight secondary batteries that have a high-energy density. Moreover, there is a large need for development of high-output secondary batteries as the power source for electric automobiles such as hybrid electric automobiles, plugin hybrid electric automobiles, battery-type electric automobiles and the like.

As a secondary battery that satisfies this kind of need, there are lithium-ion secondary batteries that are a kind of non-aqueous electrolyte secondary battery. This kind of lithium-ion secondary battery includes a negative electrode, a positive electrode, an electrolyte and the like, and a material that is capable of desorption and adsorption of lithium is used for the active material that is used as the material for the negative electrode and positive electrode.

Of this kind of lithium-ion secondary battery, a lithium-ion secondary battery that uses a positive electrode active material that includes a layered shape or spinel type lithium transition metal composite oxide for the positive electrode can obtain 4V-class voltage, so currently much research and development is being performed for a battery having high-energy density, and part of that research and development is being put into practical use.

As the positive electrode active material that is used for the positive electrode material of this kind of lithium-ion secondary battery, a lithium transition metal-containing composite oxide such as lithium cobalt composite oxide ($LiCoO_2$) that is synthesized comparatively easily, lithium nickel composite oxide ($LiNiO_2$) that uses nickel that is less expensive than cobalt, lithium nickel cobalt manganese composite oxide ($LiNi_{1/3}Co_{1/3}Mn_{1/3}O_2$), lithium manganese composite oxide ($LiMn_2O_4$) that uses manganese, lithium nickel manganese composite oxide ($LiNi_{0.5}Mn_{0.5}O_2$) and the like have been proposed.

Incidentally, in order to obtain a lithium-ion secondary battery that has excellent cycling characteristics and output characteristics, the positive electrode active material that is used for that positive electrode material preferably includes particles having a small particle size and narrow particle size distribution. Particles having a small particle size have a large specific surface area, and can sufficiently maintain a reaction surface area with the electrolyte. Moreover, by using particles having a small particle size, the electrode can be configured so as to be thin, so the distance that lithium ions travel between the positive electrode and negative electrode becomes short, and thus the electrode resistance can be reduced. On the other hand, by using particles having a narrow particle size distribution, the voltage that is applied to the particles inside the electrode is made uniform, and a decrease in battery capacity due to selective deterioration of fine particles is suppressed.

In order to further improve the output characteristics, forming spaces inside the positive electrode active material into which electrolyte can penetrate is effective. Positive electrode active material having this kind of hollow structure has larger reaction surface area than positive electrode active material that has about the same particle size but solid structure, so it is possible to greatly reduce the positive electrode resistance. The positive electrode active material is known to take on the particle characteristics of the transition metal-containing composite hydroxide that is the precursor to the positive electrode active material. In other words, in order to obtain a positive electrode active material having these excellent characteristics, it is necessary to suitably control the particle size, the particle size distribution and the particle structure of the particles of the precursor transition metal-containing composite hydroxide.

For example, JP2012246199 (A), JP2013147416 (A) and WO2012/131881 describe a method for manufacturing a transition metal-containing composite hydroxide as a precursor to a positive electrode active material by a crystallization process that is clearly separated into two stages, a nucleation process that mainly performs nucleation, and a particle growth process that mainly performs particle growth. In these methods, by appropriately adjusting the pH value and reaction atmosphere in the nucleation process and the particle growth process, a transition metal-containing composite hydroxide that includes secondary particles that have a structure that includes a low-density center section that includes fine primary particles having a small particle size and narrow particle size distribution, and a high-density outer-shell section that includes flat-shaped or needle-shaped primary particles.

Moreover, WO2014/181891 describes a method for manufacturing a transition metal-containing composite hydroxide that is characterized by including a nucleation process for performing nucleation by controlling the pH value of a nucleation aqueous solution that includes a metal compound that includes has at least a transition metal and an ammonium ion donor to be 12.0 to 14.0, and a particle growth process that causes nuclei to grow by controlling the pH value of a particle growth aqueous solution that includes the generated nuclei to 10.5 to 12.0 that is value lower than the pH value in the nucleation process, and the atmosphere is controlled so that together with the nucleation process and the start of the particle growth process being a non-oxidizing atmosphere, at least one time the atmosphere is switched to an oxidizing atmosphere at specified timing in the particle growth process, after which the atmosphere is switched again to a non-oxidizing atmosphere. With this method, a transition metal-containing composite hydroxide that includes secondary particles having a small particle size and narrow particle size distribution and having a structure that has a center section that is formed by an aggregate of plate-shaped or needle-shaped primary particles, and at least one layered structure that includes at low-density layer that is formed around the outside of the center section by an aggregate of fine primary particles and one high-density layer that is formed by an aggregate of plate-shaped primary particles, with the layers being alternately layered.

The positive electrode active materials that have these transition metal-containing composite hydroxides as a precursor are composed of particles having a small particle size and narrow particle size distribution, and that include a multi-layered structure having hollow structure or spaces. Therefore, in a secondary battery that uses these positive electrode active materials, it is considered possible to simultaneously improve battery capacity, output characteristics and cycling characteristics. However, the manufacturing methods that are described in the literature above require time to switch the reaction atmosphere in the particle growth process, so during that time, it is necessary to temporarily stop the supply of the raw material aqueous solution and the like, so there is room for improvement from the aspect of productivity. Moreover, for a positive electrode active material that is used in a secondary battery that is used as an electric power source of an electric automobile, there is a need for further improving the output characteristics thereof without impairing the battery capacity or cycling characteristics of the secondary battery.

RELATED LITERATURE

Patent Literature

[Patent Literature 1] JP2012246199 (A)
[Patent Literature 2] JP2013147416 (A)
[Patent Literature 3] WO2012/131881
[Patent Literature 4] WO2014/181891

SUMMARY OF INVENTION

Problems to be Solved by Invention

Taking the problems above into consideration, the object of the present invention is to provide a positive electrode active material that is able to simultaneously improve the battery capacity, the output characteristics, and cycling characteristics of a non-aqueous electrolyte secondary battery, and a transition metal-containing composite hydroxide that is the precursor of the positive electrode active material, and to enable efficient production of this positive electrode active material and transition metal-containing composite hydroxide in production on an industrial scale.

Means for Solving Problems

The present invention relates to a transition metal-containing composite hydroxide that is a precursor to a positive electrode active material for a non-aqueous electrolyte secondary battery, and that includes one kind of nickel (Ni), manganese (Mn) and cobalt (Co) as a main transition method. The transition metal-containing composite hydroxide of the present invention is a composite hydroxide that preferably has nickel, nickel and manganese, or nickel and manganese and cobalt, as the main body, and as necessary, may also include additional element(s).

Particularly, the transition metal-containing composite hydroxide of the present invention comprises:

secondary particles that are formed by aggregates of plate-shaped primary particles and fine primary particles that are smaller than the plate-shaped primary particles;

the secondary particles having a center section that is formed by the aggregates of plate-shaped primary particles, and at least one layered structure formed on the outside of the center section in which a low-density layer that is formed by aggregates of the plate-shaped primary particles and the fine primary particles, and a high-density layer that is formed by aggregates of the plate-shaped primary particles are layered;

the high-density layer being connected with the center section and/or other high-density layers by a high-density section that is formed inside the low-density layer by aggregates of the plate-shaped primary particles; and the secondary particles having an average particle size within the range 1 μm to 15 μm, and an index [(d90−d10)/average particle size] that indicates the particle size distribution of the secondary particles is 0.65 or less.

Preferably, the transition metal-containing composite hydroxide has a composition that is expressed by a general formula (A): $Ni_xMn_yCo_zM_t(OH)_{2+a}$ (where x+y+z+t=1, 0.3≤x≤0.95, 0.05≤y≤0.55, 0≤z≤0.4, 0≤t≤0.1, 0≤a≤0.5, and M is at least one additional element selected from among Mg, Ca, Al, Ti, V, Cr, Zr, Nb, Mo, Hf, Ta and W).

Preferably, the additional element(s) (M) are uniformly distributed inside the secondary particles and/or uniformly coated on the surface of the secondary particles.

The manufacturing method of the transition metal-containing composite hydroxide of the present invention relates to a method for manufacturing a transition metal-containing composite hydroxide that is the precursor to a positive electrode active material for a non-aqueous electrolyte secondary battery by forming a reaction aqueous solution by supplying a raw material aqueous solution that includes at least a transition metal and an aqueous solution that includes an ammonium ion donor into a reaction tank and performing a crystallization reaction.

Particularly, the manufacturing method of the transition metal-containing composite hydroxide of the present invention, comprises:

a nucleation process that adjusts the pH value of the reaction aqueous solution to a value within the range 12.0 to 14.0 at a reference liquid temperature of 25° C., and generates nuclei; and a particle-growth process that controls the pH value of the reaction aqueous solution that includes the nuclei that are obtained in the nucleation process to a value that is lower than the pH value of the nucleation process and that is within the range 10.5 to 12.0 at a reference liquid temperature of 25° C., and causes the nuclei to grow;

the reaction atmosphere in the nucleation process and in the initial stage of the particle-growth process being adjusted to be a non-oxidizing atmosphere in which the oxygen concentration is 5% by volume or less;

after the initial stage of the particle-growth process, atmosphere control being performed at least one time in which the reaction atmosphere is switched from the non-oxidizing atmosphere to an oxidizing atmosphere having an oxygen concentration that is greater than 5% by volume by directly introducing oxidizing gas into the reaction aqueous solution while continuing the supply of the raw material aqueous solution, and is further switched from the oxidizing atmosphere to a non-oxidizing atmosphere having an oxygen concentration that is 5% by volume or less by directly introducing inert gas into the reaction aqueous solution while continuing the supply of the raw material aqueous solution.

Preferably, the oxidizing gas and the inert gas are introduced by a diffusing pipe.

Preferably, in the particle-growth process, the total amount of time during which the oxidizing gas is introduced is within the range 1% to 25% with respect to the total time of the particle-growth process.

Moreover, preferably, the amount of time of the crystallization reaction in the initial stage of the particle-growth process is within the range 0.5% to 30% with respect to the total time of the particle-growth process. In other words, preferably, in the particle-growth process, the introduction of oxidizing gas is started at a time from the start of the particle-growth process that is within the range of 0.5% to 30% with respect to the total time of the particle-growth process.

The manufacturing method of the transition metal-containing composite hydroxide of the present invention can be suitably applied to a transition metal-containing composite hydroxide that is expressed by a general formula (A): $Ni_xMn_yCo_zM_t(OH)_{2+a}$ (where $x+y+z+t=1$, $0.3 \leq x \leq 0.95$, $0.05 \leq y \leq 0.55$, $0 \leq z \leq 0.4$, $0 \leq t \leq 0.1$, $0 \leq a \leq 0.5$, and M is at least one additional element selected from among Mg, Ca, Al, Ti, V, Cr, Zr, Nb, Mo, Hf, Ta and W).

In this case, preferably the manufacturing method of the transition metal-containing composite hydroxide further includes a coating process after the particle-growth process that coats the transition metal-containing composite hydroxide with compounds that include at least part of the additional element(s) (M).

The positive electrode active material for a non-aqueous electrolyte secondary battery of the present invention is a positive electrode active material for a non-aqueous electrolyte secondary battery that includes a lithium transition metal-containing composite oxide, and comprises:

secondary particles that are formed by aggregates of primary particles;

the secondary particles comprising: an outer-shell section that is an aggregate of primary particles; at least one aggregate section that is an aggregate of primary particles and that exists on the inside of the outer-shell section and is electrically and structurally connected to outer-shell section; and at least one space section that exists on the inside of the outer-shell section and in which there are no primary particles; and the average particle size of the secondary particles being within the range 1 μm to 15 μm, an index [(d90-d10)/average particle size] that indicates the spread of the particle size distribution of the secondary particles being 0.7 or less, and the surface area per unit volume being 1.7 m²/cm³ or greater.

Preferably, the BET specific surface area of the positive electrode active material is within the range 0.7 m²/g to 5.0 m²/g.

Preferably, the positive electrode active material includes lithium transition metal-containing composite oxide that has a composition that is expressed by the general formula (B): $Li_{1+u}Ni_xMn_yCo_zM_tO_2$ (where, $-0.05 \leq u \leq 0.50$, $x+y+z+t=1$, $0.3 \leq x \leq 0.95$, $0.05 \leq y \leq 0.55$, $0 \leq z \leq 0.4$, $0 \leq t \leq 0.1$, and M is at least one additional element selected from among Mg, Ca, Al, Ti, V, Cr, Zr, Nb, Mo, Hf, Ta and W); and has a layered hexagonal crystal type crystal structure.

The manufacturing method of a positive electrode active material for a non-aqueous electrolyte secondary battery of the present invention, comprises:

a mixing process that forms a lithium mixture by mixing the transition metal-containing composite hydroxide with a lithium compound; and a calcination process that calcines the lithium mixture that is formed in the mixing process in an oxidizing atmosphere at a temperature within the range 650° C. to 980° C.

Preferably, in the mixing process, the lithium mixture is adjusted so that the ratio of sum of the number of atoms of metals other than lithium included in the lithium mixture and the number of atoms of lithium is within the range 1:0.95 to 1.5.

Preferably, the manufacturing method of the positive electrode active material for a non-aqueous electrolyte secondary battery further includes a heat-treatment process before the mixing process that heat treats the transition metal-containing composite hydroxide at 105° C. to 750° C.

The manufacturing method of the positive electrode active material for a non-aqueous electrolyte secondary battery can be suitably applied to a method for manufacturing a non-aqueous electrolyte that includes a layered hexagonal crystal type of lithium transition metal-containing composite oxide that is expressed by the general formula (B): $Li_{1+u}Ni_xMn_yCo_zM_tO_2$ (where, $-0.05 \leq u \leq 0.50$, $x+y+z+t=1$, $0.3 \leq x \leq 0.95$, $0.05 \leq y \leq 0.55$, $0 \leq z \leq 0.4$, $0 \leq t \leq 0.1$, and M is at least one additional element selected from among Mg, Ca, Al, Ti, V, Cr, Zr, Nb, Mo, Hf, Ta and W). The additional element(s) (M) may also be added and mixed in together with the transition metal-containing composite hydroxide and the lithium compound in the mixing process.

The non-aqueous electrolyte secondary battery of the present invention includes a positive electrode, a negative electrode, a separator, and a non-aqueous electrolyte, wherein the positive electrode active material for a non-aqueous electrolyte secondary battery of the present invention is used as the positive electrode material of the positive electrode.

Effect of Invention

With the present invention, it is possible to provide a positive electrode active material that is capable of simultaneously improving the battery capacity, the output characteristics and cycling characteristics of a non-aqueous electrolyte secondary battery, and a transition metal-containing composite hydroxide that is a precursor to that positive electrode active material. Moreover, with the present invention, it is possible to efficiently produce this positive electrode active material and transition metal-containing composite hydroxide on an industrial scale. Therefore, with the present invention a non-aqueous electrolyte secondary battery having excellent battery characteristics can be provided. As a result, the present invention has very large industrial significance.

MODES FOR CARRYING OUT INVENTION

Figure 1:
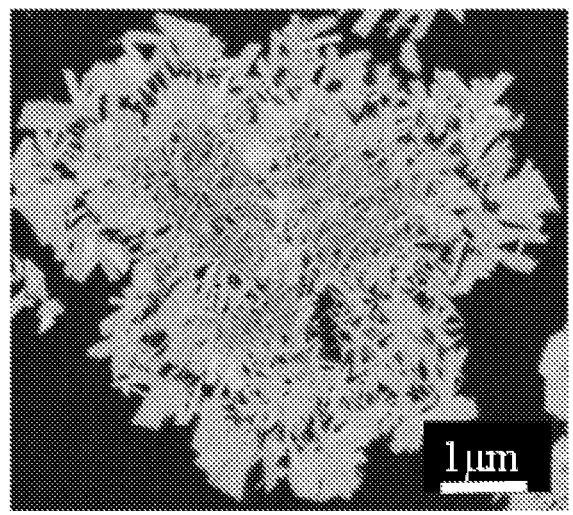
FIG. 1 is a FE-SEM photograph (5000× observation magnification rate) illustrating a cross section of secondary particles of a transition metal-containing composite hydroxide that is obtained in Example 1.

The inventors diligently performed research in order to further improve the productivity and output characteristics of positive electrode active material for a non-aqueous electrolyte secondary battery (hereafter, referred to as "positive electrode active material") based on conventional technology such as described in WO2014/181891. As a result, it was found that by directly supplying atmospheric gas into the reaction aqueous solution while continuing the supply of the raw material aqueous solution when switching the reaction atmosphere in the particle growth process, it is possible to switch the reaction atmosphere in a short time, and as a result, a transition metal-containing composite hydroxide composed of secondary particles having a center section that is formed by an aggregate of plate-shaped primary particles, and around the outside of this center section, at least one layered structure in which a low-density layer that is formed by an aggregate of plate-shaped primary particles and fine primary particles, and a high-density layer that is formed by an aggregate of plate-shaped primary particles are layered. Moreover, the high-density layer of secondary particles of this transition metal-containing composite hydroxide connects the center section and/or another high-density layer by a high-density section that is formed by an aggregate of plate-shaped primary particles inside the low-density layer. Therefore, when a positive electrode active material is formed with this transition metal-containing composite hydroxide as a precursor, the outer shell and the aggregate section of primary particles on the inside of the outer shell are electrically connected, and it is possible to sufficiently develop that path, so it was found that it is possible to greatly reduce the internal resistance of the positive electrode active material. The present invention was achieved based on these findings.

1. Transition Metal-Containing Composite Hydroxide and Manufacturing Method of Same 1-1. Transition Metal-Containing Composite Hydroxide (1) Particle Structure a) Structure of Secondary Particles The transition metal-containing composite hydroxide (hereafter, referred to as "composite hydroxide") of the present invention includes secondary particles that are formed by an aggregate of plate-shaped primary particles and fine primary particles that are smaller than the plate-shaped primary particles. The secondary particles have a center section that is formed by an aggregate of plate-shaped primary particles, and around the outside of this center section, at least one layered structure in which a low-density layer that is formed by an aggregate of plate-shaped primary particles and fine primary particles, and a high-density layer that is formed by an aggregate of plate-shaped primary particles are layered. Moreover, the high-density layer of secondary particles of this transition metal-containing composite hydroxide connects the center section and/or another high-density layer by a high-density section that is formed by an aggregate of plate-shaped primary particles inside the low-density layer.

When composite hydroxide having this kind of particle structure is calcined, the connection in the secondary particles between the high-density layer and the center section and/or other high-density layer by the high-density section in the low-density layer is maintained, and in that state, the low-density layer contracts toward the center section, the high-density layer or the high-density section as sintering contraction occurs. Therefore, the positive electrode active material includes secondary particles that are formed by an aggregate of primary particles, and has a structure that includes at least an outer-shell section that is an aggregate of primary particles, at least one aggregate section of an aggregate of primary particles that is formed by sintering contraction of the center section and/or other high-density layer exists on the inside of the outer-shell section, and is electrically connected to the outer-shell section, and at least one space section in which there are no primary particles and exists on the inside of the outer-shell section. Basically, as the low-density section that existed inside the low-density layer undergoes sintering contraction, at least one space section in which there are no primary particles is formed on the inside of the outer-shell section. On the other hand, the high-density section inside the low-density layer is such that the primary particles aggregate due to the sintering contraction of the high-density section, and this high-density section functions as a connecting section that electrically and structurally connects the outer-shell section and aggregate section. As a result, in the secondary particles of the positive electrode active material of the present invention, not only is it possible to sufficiently maintain the surface area inside the secondary particles by the existence of the space section and the connecting section, the structure is such that the outer-shell section and the aggregate section inside the outer-shell section are connected, so it is possible to improve the particle density and particle strength. Therefore, in a secondary battery that uses positive electrode active material with this kind of structure as positive electrode material, it becomes possible to simultaneously improve the output characteristics, the battery capacity and cycling characteristics of the secondary battery.

In this composite hydroxide, when the low-density layer is formed over the entire outside of the center section, a space section is formed in the positive electrode active material on the outside of the center section, and an outer-shell section that is electrically and structurally connected with the center section by a connecting section having sufficient surface area is formed on the outside of the space section. When a plurality of low-density layers are formed, at least one inner-shell section that is electrically and structurally connected with the center section and the outer-shell section by connecting sections that exist between the center section and the outer-shell section and in the multiple layer space section is formed. In other words, basically, the outer-shell section and inner-shell section are configured with shell-shaped structure in which the outer-shell section and inner-shell section are electrically and structurally connected together and with the center section by connecting sections. However, in the positive electrode active material, depending on the amount of sintering contraction as will be described later, the structure in which these primary particles aggregate, including the center section, may include a plurality of aggregates.

Moreover, the present invention also includes structure in which the low-density layer is partially formed on the outside of the center section. In this case, the positive electrode active material has a structure in which multiple space sections are dispersed and formed on the outside of the center section, and furthermore an outer-shell section is formed on the outside of these sections, or an inner-shell section and outer-shell section are formed thereon.

Furthermore, the center section of secondary particles of the composite hydroxide may be such that a plurality of aggregate particles that are formed by an aggregate of plate-shaped primary particles are connected. In this case, the structure is such that a low-density layer having a high-density section and a high-density layer are formed on the outside of a center section that includes aggregate sections that are connected together.

b) Fine Primary Particles

Of the secondary particles of the composite hydroxide, the fine primary particles of the low-density layer except the high-density section have an average particle size preferably within the range 0.01 µm to 0.3 µm, and more preferably within the range 0.1 µm to 0.3 µm. When the average particle size of the fine primary particles is less than 0.01 µm, the low-density layer having a sufficient size may not be formed. On the other hand, when the average particle size of the fine primary particles is greater than 0.3 µm, contraction during calcination may not proceed in the low-temperature range, and the difference in the contraction between the low-density layer and the center section and the high-density layer is small, so a space section having sufficient size may not be formed inside the outer-shell section of the positive electrode active material.

The shape of fine primary particles is preferably plate-shaped and/or needle shaped. As a result, it is possible to make the difference between the density if the low-density layer and the center section and high-density layer sufficiently large. However, depending on the composition of the composite hydroxide, particles having a rectangular parallelepiped shape, elliptical shape, rhombohedral shape and the like may be included in the fine primary particles.

Composite hydroxide is embedded in resin or the like, a cross-section polisher is used create a state in which the cross section can be observed, the cross section is observed using a scanning electron microscope (SEM) and the average particle size of the fine primary particles and the plate-shaped primary particles can be found in the following way. First, the maximum diameters of 10 or more fine primary particles or plate-shaped primary particles that exist on the cross section of secondary particles are measured, then the average value is found, and this value is taken to be the particle size of the fine primary particles or plate-shaped primary particles in the secondary particles. Next, the particle sizes of fine primary particles or plate-shaped particles are found in the same way for 10 or more secondary particles. Finally, by taking the average of the particle sizes of the fine primary particles or plate-shaped particles of these secondary particles, it is possible to find the average particle size of the fine primary particles or plate-shaped primary particles.

c) Plate-Shaped Primary Particles

The plate-shaped primary particles that form the center section, the high-density layer and high-density section of the secondary particles of the composite hydroxide have an average particle size that is preferably within the range 0.3 µm to 3 µm, and more preferably within the range 0.4 µm to 1.5 µm, and even more preferably within the range 0.4 µm to 1.0 µm. When the average particle size of the plate-shaped primary particles is less than 0.3 µm, contraction during calcination begins from the low-temperature range, and the difference between these layers and the low-density layer becomes small, so spaces having a sufficient size may not be formed inside the outer-shell sections of the positive electrode active material. On the other hand, when the average particle size of the plate-shaped primary particles is greater than 3 µm, calcination must be performed at high temperature in order to achieve sufficient crystallinity of the positive electrode active material, so sintering proceeds between secondary particles and it becomes difficult to control the average particle size and particle size distribution of the positive electrode active material to be within a specified range. In the case of plate-shaped particles as well, depending on the composition of the composite hydroxide, particles having a rectangular parallelepiped shape, elliptical shape, rhombohedral shape and the like may be included in the plate-shaped primary particles. However, as long as primary particles of these shapes have an average particle size within the range above, the particles are also included in the plate-shaped primary particles.

d) Thickness of the Center Section, Low-Density Layer and High-Density Layer

In the composite hydroxide of the present invention, the structure of center section and high-density layer of the secondary particles changes in the positive electrode active material, however the ratio of the outer diameter of the center section and the thickness of the high-density layer with respect to the particle size of the secondary particles is mostly maintained in the positive electrode active material that has this as a precursor. Therefore, in the composite hydroxide stage, by suitably controlling the ratio of the thickness of the center section and high-density layer with respect to the particle size of the secondary particles, it is possible to easily control the basic particle structure of the positive electrode active material.

[When There is Only One Layered Structure]

When the secondary particles of the composite hydroxide has only one layered structure described above, the average value of the ratio of the outer diameter of the center section with respect to the particle size of the secondary particles (hereafter, referred to as the "center section particle size ratio") is preferably within the range 30% to 80%, and more preferably within the range 40% to 75%. As a result, it is possible to make the size of the low-density layer and high-density layer a suitable size while at the same time sufficiently maintain the surface area of the internal part of the secondary particles.

Moreover, the average value of the ratio of the thickness of the high-density layer with respect to the particle size of the secondary particles (hereafter, referred to as the "high-density-layer particle size ratio") is preferably within the range 5% to 25%, and more preferably within the range 5% to 20%. As a result, not only is it possible to maintain the size of the low-density layer, but it is also possible to suppress excessive contraction of the high-density layer during calcination.

When the secondary particles have only one layered structure, the center section particle size ratio and the high-density layer particle size ratio can be found as follows using a cross section SEM photo of the secondary particles. First, on the cross section SEM photo, the thickness of the high-density layer is measured at three or more arbitrary locations per particle, and the average value is found. Here, the thickness of the high-density layer is the distance between two points that is the shortest distance from the outer perimeter of the secondary particle to the boundary between the high-density layer and the low-density layer. At the same time, the maximum distance between two points on the outer perimeter of the center section and two points on the outer perimeter of the secondary particles is measured, and these values are taken to be the outer diameter of the center section and the particle size of the secondary particle, respectively. By dividing the outer diameter of the center section and the thickness in the radial direction of the high-density layer by the particle size of the secondary particle, the ratio of the outer diameter of the center section and the ratio of the thickness of the high-density layer with respect to the particle size of the secondary particle are respectively found. The same measurement is performed for 10 or more secondary particles, and by calculating the average value, the center section particle size ratio and the high-density layer particle size ratio with respect to the particle size of a secondary particle are found.

[When There are Two or More Layered Structures]

When the secondary particles of the composite hydroxide have two or more layer structures described above, the center section particle size ratio of the secondary particles is preferably within the range 15% to 70%, and more preferably within the range 20% to 70%, and even more preferably within the range 25% to 65%. Moreover, the high-density layer particle size ratio of the secondary particles, and more specifically in this form, the average value of the total ratio of the thickness of plural high-density layers with respect to the particle size of the secondary particles is preferably within the range 10% to 40%, and more preferably within the range 15% to 35%. Furthermore, the ratio of the thickness per layer of the high-density layers with respect to the particle size of the secondary particles (hereafter, referred to as the "high-density layer 1-layer particle size ratio") is preferably within the range 5% to 25%, and more preferably within the range 5% to 20%.

When the secondary particles have two or more layered structures, except for measuring the thicknesses of each of the plural high-density layers, the center section particle size ratio, the high-density layer particle size ratio and the high-density layer 1-layer particle size ratio with respect to the particle size of the secondary particles can be found in the same way.

(2) Average Particle Size

In the composite hydroxide of the present invention, the average particle size of the secondary particles is adjusted to be within the range 1 µm to 15 µm, and preferably within the range 3 µm to 12 µm, and even more preferably within the range 3 µm to 10 µm. The average particle size of the secondary particles is correlated with the average particle size of the positive electrode active material that is prepared from this composite hydroxide as a precursor. Therefore, by controlling the average particle size of the secondary particles of composite hydroxide to be within such a range, it becomes possible to control the average particle size of the positive electrode active material that is prepared from this composite hydroxide as a precursor to be within a specified range.

In the present invention, the average particle size of the secondary particles means the volume-based average particle size (MV), and for example, can be found from the volume integrated value that is measured using a laser light diffraction scattering type particle size analyzer.

(3) Particle Size Distribution

In the composite hydroxide of the present invention, the index [(d90-d10)/average particle size] that indicates the spread of the particle size distribution of secondary particles is adjusted to be 0.65 or less, and preferably 0.55 or less, and more preferably 0.50 or less.

The particle size distribution of the positive electrode active material is strongly affected by the composite hydroxide as a precursor. Therefore, when composite hydroxide that includes fine particles and coarse particles is used as the precursor, fine particles and coarse particles are also included in the positive electrode active material, and it becomes impossible to sufficiently improve the safety, cycling characteristics and output characteristics of a secondary battery that uses this positive electrode active material. However, when the index [(d90-d10)/average particle size] is adjusted to be 0.65 or less in the composite hydroxide stage, it is possible to make the particle size distribution of the positive electrode active material that has this composite hydroxide as a precursor narrow, and thus it is possible to avoid the problem described above. However, presuming that production will be on an industrial scale, using composite hydroxide of which the index [(d90-d10)/average particle size] is excessively small is not practical. Therefore, preferably the lower limit for the index [(d90-d10)/average particle size] in the composite hydroxide is approximately 0.25.

Here, d10 is the particle size when the number of particles of all particle sizes are accumulated according to particle size starting from the smallest particle size, and the volume of the accumulate particles becomes 10% of the total volume of particles, and d90 is the particle size when the number of particles is similarly accumulated and the volume of the accumulate particles becomes 90% of the total volume of particles. The values of d10 and d90, as in the case of the average particle size, can be found from the volume integrated value that is measured by a laser diffraction scattering type particle size analyzer.

(4) Composition

The composition of the composite hydroxide of the present invention is not limited as long as the secondary particles of the composite hydroxide have the particle structure, particle size and particle size distribution described above. In other words, a feature of the present invention is the particle structure, average particle size and particle size distribution of the composite hydroxide, and the present invention can be widely applied to a composite hydroxide that includes at least a transition metal, and more specifically, includes one of nickel (Ni), manganese (Mn) and cobalt as the main transition metal. Moreover, in addition to the main transition metal above, the composite hydroxide of the present invention may include other transition metals or other metal as additional element(s).

However, the composite hydroxide of the present invention preferably is a composite hydroxide that mainly includes, nickel, nickel and manganese, or nickel and manganese and cobalt, and particularly has a composition that can be expressed by the general formula (A): $Ni_xMn_yCo_zM_t(OH)_{2+a}$ (where $x+y+z+t=1$, $0.3 \leq x \leq 0.95$, $0.05 \leq y \leq 0.55$, $0 \leq z \leq 0.4$, $0 \leq t \leq 0.1$, $0 \leq a \leq 0.5$, and M is at least one additional element selected from among Mg, Ca, Al, Ti, V, Cr, Zr, Nb, Mo, Hf, Ta and W). By using composite hydroxide having this composition as a precursor, it is possible to easily obtain a positive electrode active material that is expressed by a general formula (B) (described later), and thus it is possible to achieve even higher battery performance.

In composite hydroxide having composition that is expressed by this general formula (A), the additional element(s) (M) can be crystallized together with the main transition metals (nickel, manganese and cobalt) in a crystallization process described later, and uniformly dispersed into the secondary particles of composite hydroxide, however, the surface of the secondary particles of composite hydroxide may also be covered with the additional element(s) (M) after the crystallization process. Moreover, in a mixing process, a compound of the additional element(s) (M), together with the composite hydroxide, may be mixed with a lithium compound. Furthermore, adding additional element(s) (M) in a crystallization process, coating the additional element(s) (M) in a coating process, and adding the additional element(s) (M) in a mixing process may also be arbitrarily used in combination. Regardless of the method used, it is necessary that the amount of main transition metals and additional element(s) (M) included be adjusted so that the composition becomes that of general formula (A).

In a composite hydroxide that is expressed by the general formula (A), the compositional range and the critical significance of the composition of nickel, manganese, cobalt and additional element(s) (M) is the same as that of positive electrode active material that is expressed by general formula (B). Therefore, an explanation of this will be omitted here.

1-2. Method for Producing Composite Hydroxide (1) Crystallization Reaction

In the method for producing composite hydroxide of the present invention, a reaction aqueous solution is formed by supplying a raw material aqueous solution that includes as main transition metals at least transition metal, and preferably, nickel, nickel and manganese, or nickel and manganese and cobalt, and an aqueous solution that includes an ammonium ion donor to a reaction tank, and a composite hydroxide is obtained by a crystallization reaction.

Particularly, in the method for producing composite hydroxide of the present invention, the crystallization reaction is clearly divided into two processes: a nucleation process in which nucleation is mainly performed, and a particle-growth process in which growth of nuclei is mainly performed, or in other words, particle growth is performed; and together with adjusting the crystallization conditions in each respective process, in the particle-growth process, while maintaining the supply of the raw material aqueous solution, the reaction atmosphere, or in other words, the atmosphere that comes in contact with the reaction aqueous solution, is suitably changed between a non-oxidizing atmosphere and an oxidizing atmosphere; and when changing the atmosphere, an atmosphere gas, or in other words, an oxidizing gas or inert gas is directly supplied, and by switching the reaction atmosphere, it is possible to efficiently obtain a composite hydroxide that includes secondary particles having the particle structure, the average particle size and particle size distribution described above. In other words, in the present invention, it is possible to control the amount of oxygen that is dissolved in the reaction aqueous solution that is the atmosphere of the reaction field in a short amount of time, and it is possible to switch the atmosphere of the reaction field while maintaining the supply of raw material aqueous solution, and thus it is possible to obtain a composite hydroxide having the particle structure of secondary particles described above.

[Nucleation Process]

In the nucleation process, first the compound of transition metals that are the raw materials in this process are dissolved in water, and the raw material aqueous solution is prepared. At the same time, an aqueous solution that includes alkali aqueous solution and an ammonium ion donor are supplied to and mixed in the reaction tank, and a reaction aqueous solution is prepared so that the pH value that is measured at a reference liquid temperature of 25° C. is within the range 12.0 to 14.0, and the ammonium ion concentration is within the range 3 g/L to 25 g/L. The pH value of the reaction aqueous solution can be measured using a pH meter, and the ammonium ion concentration can be measured by an ion meter.

Next, the raw material aqueous solution is supplied while stirring this reaction aqueous solution. As a result, a nucleation aqueous solution that is the reaction aqueous solution in this nucleation process is formed in the reaction tank. The pH value of this nucleation aqueous solution is within the range described above, so in the nucleation process there is very little nuclei growth and nucleation occurs preferentially. In the nucleation process, as nuclei are generated, the pH value and the ammonium ion concentration of the nucleation aqueous solution changes, so alkali aqueous solution and ammonia aqueous solution are timely supplied to control and maintain the pH value of the liquid in the reaction tank within the range pH 12.0 to 14.0 at a reference liquid temperature of 25° C., and maintain the ammonium ion concentration within the range 3 g/L to 25 g/L.

In the nucleation process, inert gas is circulated inside the reaction tank to adjust the reaction atmosphere to a non-oxidizing atmosphere having an oxygen concentration of 5% by volume or less.

Here, when emphasis is placed on increasing the capacity of the secondary battery, preferably the pH value of the liquid inside the reaction tank is controlled so that at a reference liquid temperature of 25° C. the pH value is 12.5 or less, and adjustment of the reaction atmosphere is performed before starting the supply of raw material aqueous solution. As a result, the structure of the center section of the positive electrode active material having this composite hydroxide as a precursor becomes solid, and thus it becomes possible to suppress a decrease in the particle density due to forming space sections.

However, when emphasis is placed on further increasing the output of the secondary battery, preferably before adjustment to a non-oxidizing atmosphere ends, the nucleation process is started by starting the supply of raw material aqueous solution. As a result, it is possible to form a low-density section that is an aggregate of fine primary particles inside the center section of the secondary particles of composite hydroxide, and in the positive electrode active material that is obtained, a space section can also be formed inside the center section, so it becomes possible to further increase the reaction surface area with the electrolyte. In this case, adjustment of the reaction atmosphere to a non-oxidizing atmosphere is preferably performed from the start of the nucleation process and ended within the range of 10% to 25% of the entire time of the nucleation process.

Moreover, by controlling the pH value in the nucleation process to a high pH greater than 12.5, it is also possible to form a low-density section of an aggregate of fine primary particles inside the center section. In other words, on the high pH side, there is a tendency for the primary particles that form the nucleus to become finer, and by controlling the pH value to be within a range greater than 12.5 but no greater than 14.0, it is possible to suppress the growth of the nuclei, and form nuclei that are an aggregate of fine primary particles, and furthermore, by causing the nuclei to grow in the particle-growth process, it is possible to form a center section having a low-density section inside.

In the nucleation process, the supply of inert gas to the inside of the reaction tank, can be either a method of supplying the inert gas to spaces inside the reaction tank, or can be a method of directly supplying the inert gas into the pre-reaction aqueous solution. In the case of the former, by adjusting the reaction atmosphere to a non-oxidizing atmosphere from before nucleation, it is possible to form a high-density center section. In the case of the latter, in the initial state of the nucleation process, it is possible to switch the atmosphere of the reaction field from an oxidizing atmosphere to a non-oxidizing atmosphere, and when doing this, it is possible to shorten the switching time, so regardless of the size of the center section, it becomes possible to form a low-density section inside the center section.

In the nucleation process, by supplying an aqueous solution that includes a raw material aqueous solution, alkali aqueous solution, and ammonium ion donor to the nucleation aqueous solution, continuous generation of new nuclei is continued. Then, at the instant when a specified amount of nuclei are generated in the nucleation aqueous solution, the nucleation process ends.

When doing this, the amount of nuclei generated can be determined from the amount of metallic compound that is included in the raw material aqueous solution that is supplied to the nucleation aqueous solution. The amount of nuclei that is generated in the nucleation process is not particularly limited, however, in order to obtain secondary particles of composite hydroxide having a narrow particle size distribution, preferably is within the range 0.1 atomic % to 2 atomic %, and more preferably within the range 0.1 atomic % to 1.5 atomic % with respect to the metal atoms in the metallic compound that is included in the raw material aqueous solution that is supplied via the nucleation process and particle growth process.

[Particle-Growth Process]

After the nucleation process ends, the pH value of the nucleation aqueous solution inside the reaction tank is adjusted to be within the range 10.5 to 12.0 at a reference liquid temperature of 25° C., to form a particle-growth aqueous solution that is the reaction aqueous solution in the particle-growth process. The pH value can be adjusted even by stopping the supply of alkali aqueous solution, however, in order to obtain secondary particles of composite hydroxide having a narrow particle size distribution, preferably the pH value is adjusted after temporarily stopping the supply of all aqueous solutions. More specifically, after the supply of all aqueous solutions is stopped, preferably the pH value is adjusted by supplying the same kind of inorganic acid as the acid of the metal compound of the raw material to the nucleation aqueous solution.

Next, the supply of raw material aqueous solution is restarted while stirring this particle-growth aqueous solution. When doing this, the pH value of the particle-growth aqueous solution is within the range described above, so particle growth proceeds with hardly any new nuclei being generated, and, secondary particles of composite hydroxide having a specified particle size are formed. Even in the particle-growth process, as particles grow, the pH value and the ammonium ion concentration of the particle-growth aqueous solution change, so it is necessary to maintain the pH value and the ammonium ion concentration within the ranges described above by timely supplying alkali aqueous solution and ammonia aqueous solution.

Particularly, in the method for manufacturing composite hydroxide of the present invention, the center section of secondary particles of the composite hydroxide is formed in the initial state of the particle-growth process while maintaining as is the non-oxidizing atmosphere of the nucleation process. Next, after the initial stage of the particle-growth process ends, the reaction atmosphere is switched from a non-oxidizing atmosphere to an oxidizing atmosphere having an oxygen concentration greater than 5% by volume by directly supplying oxidizing gas to the reaction aqueous solution while continuing the supply of raw material aqueous solution. As a result, a low-density layer is formed around the center section of the secondary particles of composite hydroxide. Furthermore, by directly supplying inert gas to the reaction aqueous solution, the atmosphere is switched again from an oxidizing atmosphere to a non-oxidizing atmosphere having an oxygen concentration that is 5% by volume or less. As a result, a high-density layer is formed around the center section and low-density layer of the secondary particles of composite hydroxide. In the present invention, this kind of atmosphere control is performed at least one time. After that, control of the reaction atmosphere can be repeated by similarly switching from a non-oxidizing atmosphere to an oxidizing atmosphere, and from an oxidizing atmosphere to a non-oxidizing atmosphere. By performing this kind of control, it becomes possible to obtain composite hydroxide that includes secondary particles having the particle structure described above.

In the method for producing this kind of composite hydroxide, metal ions become nuclei or primary particles and are precipitated out in the nucleation process and the particle-growth process. Therefore, the ratio of liquid component with respect to the metal component of the nucleation aqueous solution and the particle-growth aqueous solution increases. As a result, it is apparent that the concentration of raw material aqueous solution decreases, and particularly in the particle-growth process, there is a possibility that growth of secondary particles of composite hydroxide will become stagnant. Therefore, in order to suppress an increase in the liquid component, preferably part of the liquid component of the particle-growth aqueous solution is discharged to the outside of the reaction tank during the particle-growth process after the nucleation process ends. More specifically, preferably the supply of and stirring of the aqueous solution that includes the raw material aqueous solution, the alkali aqueous solution and the ammonium ion donor are temporarily stopped, and nuclei and secondary particles in the particle-growth aqueous solution are allowed to settle, then the supernatant liquid of the particle-growth aqueous solution is discharged. By performing this kind of operation, it is possible to increase the relative concentration of the mixed aqueous solution in the particle-growth aqueous solution, so not only is it possible to prevent stagnation of particle growth and control the particle size distribution of secondary particles of the obtained composite hydroxide to be within a suitable range, it is also possible to improve the density of secondary particles as a whole.

[Controlling the Particle Size of Secondary Particles of Composite Hydroxide]

The particle size of secondary particles of composite hydroxide that is obtained as described above can be controlled by the time of the particle-growth process and nucleation process, the pH value of the nucleation aqueous solution and particle-growth aqueous solution, and the amount of raw material aqueous solution that is supplied. For example, by performing the nucleation process at a high pH value, or by lengthening the time of the nucleation process, the amount of metal compound that is included in the raw material aqueous solution that is supplied is increased, and the amount of nuclei generated is increased, and thus it is possible to reduce the particle size of the secondary particles of composite hydroxide that are obtained. On the other hand, by controlling the amount of nuclei that is generated in the nucleation process, it is possible to increase the particle size of secondary particles of composite hydroxide that is obtained.

[Another Embodiment of a Crystallization Reaction]

In the method for manufacturing composite hydroxide of the present invention, a component adjustment aqueous solution that is adjusted to a pH value and ammonium ion concentration that is suitable to the particle-growth process may be prepared separately from the nucleation aqueous solution, and the nucleation aqueous solution after the nucleation process, and preferably, part of the liquid component that is removed from the nucleation aqueous solution after the nucleation process is added to and mixed with this component adjustment aqueous solution, and the particle-growth process may be performed with this as the particle-growth aqueous solution.

In this case, it is possible to more certainly perform separation of the nucleation process and particle-growth process, so it is possible to control the reaction aqueous solutions in the respective processes so as to be in the optimal state. Particularly, it is possible to control the pH value of the particle-growth aqueous solution from the start of the particle-growth process to be within an optimal range, so it is possible to make the particle size distribution of the secondary particles of the composite hydroxide obtained narrower. In this case, inert gas may be supplied into the reaction tank before the start of the particle-growth process so as to make a non-oxidizing atmosphere having an oxygen concentration of 5% by volume or less from the start of the initial state of the particle-growth process.

(2) Supply Aqueous Solution a) Raw Material Aqueous Solution

In the present invention, the ratio of the metal elements in the raw material aqueous solution generally becomes the composition of the composite hydroxide obtained. Therefore, the amounts of metal elements included in the raw material aqueous solution are suitably adjusted according to the composition of the target composite hydroxide. For example, when a composite hydroxide that is expressed by the general formula (A) is to be obtained, the ratios of the metal elements in the raw material aqueous solution are adjusted so that Ni:Mn:Co:M=x:y:z:t (where, x+y+z+t=1, $0.3 \leq x \leq 0.95$, $0.05 \leq y \leq 0.55$, $0 \leq z \leq 0.4$, $0 \leq t \leq 0.1$).

The compound of transition metals for adjusting the raw material aqueous solution is not particularly limited, however, from the aspect of ease of handling, preferably water soluble nitrate, sulfate, hydrochloride, and the like are used, and from the aspect of cost and preventing halogens being mixed in, using sulfate is particularly preferred.

Moreover, when additional element(s) (M), in other words, at least one additional element selected from among Mg, Ca, Al, Ti, V, Cr, Zr, Nb, Mo, Hf, Ta and W is included in the composite hydroxide, preferably a water soluble compound is similarly used as the compound for supplying the additional element(s) (M); and for example, it is possible to suitably use magnesium sulfate, calcium sulfate, aluminum sulfate, titanium sulfate, ammonium peroxotitanate, titanium potassium oxalate, vanadium sulfate, ammonium vanadate, chromium sulfate, potassium chromate, zirconium sulfate, niobium oxalate, ammonium molybdate, hafnium sulfate, sodium tantalate, sodium tungstate, ammonium tungstate, and the like.

The concentration of raw material aqueous solution for the total metal compound is preferably within the range 1 mol/L to 2.6 mol/L, and more preferably within the range 1.5 mol/L to 2.2 mol/L. When the concentration of raw material aqueous solution is less than 1 mol/L, the amount of crystallization per reaction tank decreases, so productivity decreases. On the other hand, when the concentration of mixed aqueous solution is greater than 2.6 mol/L, the concentration is greater than the saturation concentration at room temperature, so crystals of the respective metal compounds are precipitated out again, and there is a possibility that piping and the like could become clogged.

The metal compound described above does not absolutely need to be supplied to the reaction tank as a raw material aqueous solution. For example, when performing a crystallization reaction using a metal compound that reacts when mixed to generate a compound other than the target compound, a metal compound aqueous solutions may be individually prepared so that the total concentration of the metal compound aqueous solution is within the range described above, and may be supplied as an aqueous solution of the individual metal compound to the reaction tank at specified ratios.

Moreover, the amount of raw material aqueous solution that is supplied is adjusted so that at the instant when the particle-growth process ends, the concentration of product in the particle-growth aqueous solution is preferably within the range 30 g/L to 200 g/L, and more preferably within the range 80 g/L to 150 g/L. When the concentration of product is less than 30 g/L, the aggregates of fine particles may not be sufficient. On the other hand, when the concentration of product is greater than 200 g/L, the nucleation metal salt aqueous solution or particle-growth metal salt aqueous solution may not be sufficiently dispersed, and biased particle growth may occur.

b) Alkali Aqueous Solution

The alkali aqueous solution for adjusting the pH value of the reaction aqueous solution is not particularly limited, and it is possible to use a typical alkali metal hydroxide aqueous solution such as sodium hydroxide, potassium hydroxide and the like. The alkali metal hydroxide can be added directly to the reaction aqueous solution, however, from the aspect of the ease of controlling the pH, preferably is added as an aqueous solution. In this case, the concentration of the alkali metal hydroxide is preferably within the range 20% by mass to 50% by mass, and more preferably within the range 20% by mass to 30%. By regulating the concentration of the alkali metal solution to be within this kind of range, it is possible to prevent the pH value from becoming locally high at the position where added, while suppressing the amount of solvent (amount of water) that is supplied to the reaction system, so it becomes possible to efficiently obtain a composite hydroxide that includes secondary particles having a narrow particle size distribution.

The method for supplying the alkali aqueous solution is not particularly limited as long as it is possible to maintain the pH value of the reaction aqueous solution within a specified range without becoming high locally. For example, the alkali aqueous solution may be supplied by a pump such as a metering pump that is capable of controlling the flow rate, while sufficiently stirring the reaction aqueous solution.

c) Aqueous Solution that Includes an Ammonium Donor

The aqueous solution that includes an ammonium donor is also not particularly limited, and for example, it is possible to use ammonia water or an aqueous solution such as ammonium sulfate, ammonium chloride, ammonium carbonate, ammonium fluoride and the like.

When ammonia water is used as the ammonium ion donor, the concentration of the ammonia water is preferably within the range 20% by mass to 30% by mass, and more preferably within the range 22% by mass to 28% by mass. By regulating the concentration of ammonia water to be within such a range, it is possible to suppress the loss of ammonium due to volatilization or the like, so it becomes possible to improve productivity.

As in the case of the alkali aqueous solution, the method for supplying an aqueous solution that includes an ammonium ion donor can also be by a pump that is capable of controlling the flow rate.

(3) pH Value a) Nucleation Process

In the nucleation process, it is necessary to control the nucleation aqueous solution that is the reaction aqueous solution to be within the range 12.0 to 14.0 at a reference liquid temperature of 25° C., and preferably within a range of 12.3 to 13.5, and more preferably within a range greater than 12.5 but no greater than 13.3. As a result, it becomes possible to suppress growth of nuclei and to prioritize nucleation, and it is possible to make the nuclei generated in this process uniform with a narrow particle size distribution. Moreover, as described above, by making the pH value greater than 12.5, it becomes possible to form a low-density section inside the center section of secondary particles of composite hydroxide. When the pH value is less than 12.0, particle growth proceeds together with nucleation, so the particle size of the secondary particles of composite hydroxide obtained becomes non-uniform, and the particle size distribution becomes worse. Moreover, when the pH value is greater than 14.0, the generated nuclei become too fine, so a problem of the nucleation aqueous solution becoming a gel occurs.

b) Particle-Growth Process

In the particle-growth process, it is necessary to control the pH value of the particle-growth aqueous solution that is the reaction aqueous solution to be within the range 10.5 to 12.0 at a reference liquid temperature of 25° C., and preferably within a range 11.0 to 12.0, and more preferably within a range 11.5 to 12.0. As a result, the generation of new nuclei is suppressed and it becomes possible to prioritize particle growth, and it is possible to make the secondary particles of the composite hydroxide that is obtained uniform with a narrow particle size distribution. On the other hand, when the pH value is less than 10.5, the ammonium ion concentration increases and the solubility of metal ions increases, so not only does the speed of the crystallization reaction become slow, the amount of metal ions remaining in the reaction aqueous solution increases, and productivity worsens. Moreover, when the pH value is greater than 12.0, the amount of nucleation in the particle-growth process increases, the particle size of the secondary particles of composite hydroxide that is obtained becomes non-uniform, and the particle size distribution of the secondary particles worsens.

In both processes, the variation range of the pH value during the crystallization reaction is preferably controlled to be ±0.2 or less. When the variation range of the pH value is large, the ratio of the nucleation amount or the particle growth is not fixed, so it becomes difficult to obtain a composite hydroxide that includes secondary particles having a narrow particle size distribution.

Moreover, the pH value of 12.0 is the boundary condition between nucleation and particle growth, so depending on whether or not there are nuclei remaining in the reaction aqueous solution, it is possible to set the condition for either the nucleation process or the particle-growth process. In other words, after a large amount of nuclei are generated by making the pH value during the nucleation process higher than 12.0, the pH value of the particle-growth process is made to be 12.0, and because a large amount of nuclei are present in the reaction aqueous solution, particle growth takes precedence, and it is possible to obtain secondary particles of composite hydroxide having a narrow particle size distribution. On the other hand, when the pH value of the nucleation process is 12.0, there are no nuclei in the reaction aqueous solution to grow, so nucleation takes precedence, and by making the pH value of the particle-growth process less than 12.0, generated nuclei grow and it is possible to obtain secondary particles of composite hydroxide having good particle characteristics. In either case, the pH value of the particle-growth process is made to be a value that is lower than the pH value of the nucleation process, and in order to clearly separate nucleation and particle growth, the pH value of the particle-growth process is preferably lower than the pH value of the nucleation process by 0.5 or more, and more preferably is lower by 1.0 or more.

(4) Reaction Atmosphere

In the method for producing composite hydroxide of the present invention, together with controlling the pH value in the respective processes, controlling the reaction atmosphere has important significance. In other words, after controlling the pH value of the respective processes, by adjusting the reaction atmosphere of the nucleation process and the initial state of the particle-growth process to be a non-oxidizing atmosphere, nuclei are generated, then after that, by growing each of the nuclei, a center section that is an aggregate of plate-shaped primary particles is formed. Moreover, during the particle-growth process, by quickly switching the reaction atmosphere of the reaction field from a non-oxidizing atmosphere to an oxidizing atmosphere by directly supplying oxidizing gas to the reaction aqueous solution while continuing the supply of raw material aqueous solution, a low-density layer that is an aggregate of plate-shaped primary particles and fine primary particles is formed on the outside of the center section, and furthermore, by quickly switching the reaction atmosphere of the reaction field from an oxidizing atmosphere to a non-oxidizing atmosphere by directly supplying inert gas to the reaction solution while continuing the supply of raw material aqueous solution, it is possible to form a high-density layer that is an aggregate of plate-shaped primary particles on the outside of the center section and low-density layer.

a) Non-Oxidizing Atmosphere

In the manufacturing method of the present invention, the reaction atmosphere in at least the stages of forming the outermost section and high-density layer of the center section of secondary particles of the composite hydroxide is controlled to be a non-oxidizing atmosphere. More specifically, it is necessary to control the mixed atmosphere of oxygen and inert gas so that the oxygen concentration in the reaction atmosphere is 5% by volume or less, and preferably 2% by volume or less, and more preferably 1% by volume or less. As a result, it is possible to grow the nuclei that are generated in the nucleation process a certain extent while suppressing unnecessary oxidation by sufficiently reducing the oxygen concentration in the atmosphere of the reaction field, so it is possible to configure the center section and high-density layer of secondary particles of the composite hydroxide with aggregates of plate-shaped primary particles having an average particle size within the range 0.3 μm to 3 μm, and a narrow particle size distribution.

b) Oxidizing Atmosphere

On the other hand, in the stage for forming a low-density layer of secondary particles of the composite hydroxide, the reaction atmosphere is controlled to be an oxidizing atmosphere. More specifically, the reaction atmosphere is controlled so that the oxygen concentration in the reaction atmosphere is greater than 5% by volume, and preferably 10% by volume or more, and more preferably to an air atmosphere (oxygen concentration: 21% by volume). By suppressing the growth of primary particles by sufficiently increasing the oxygen concentration in the atmosphere of the reaction field by controlling the oxygen concentration in the reaction atmosphere to be within this kind of range, the average particle size of the primary particles is made to be within the range 0.01 µm to 0.3 µm, and it is possible to form a low-density layer having a sufficient density difference with the center section and high-density layer described above.

The upper limit of the oxygen concentration of the reaction atmosphere in this stage is not particularly limited, however, when the oxygen concentration is excessively high, the average particle size of the primary particles becomes less than 0.01 µm, and the low-density layer may not become large enough. Therefore, preferably the oxygen concentration is 30% by volume or less. Moreover, in order to make the low-density layer, the center section and the high-density layer distinct, preferably the difference between the oxygen concentration before and after switching the atmosphere is 3% by volume or more.

In the particle-growth process, the percentage of the total time for introducing oxidizing gas into the reaction atmosphere with respect to the total time of the particle-growth process is preferably within the range 1% to 25%, and more preferably within the range 1% to 20%. When the crystallization reaction time in an oxidizing atmosphere with respect to the total time of the particle-growth process becomes less than 1%, a low-density layer is not sufficiently formed in the secondary particles of composite hydroxide, so the size of the space section in the positive electrode active material that is prepared from this composite hydroxide as a precursor may not become sufficiently large. On the other hand, when this percentage is greater than 25%, a high-density layer is not sufficiently formed in the secondary particles of composite hydroxide, so the thickness of the inner-shell section or outer-shell section of the positive electrode active material becomes excessively thin, and a problem with the strength of the positive electrode active material occurs.

c) Timing of Atmosphere Control

In the particle-growth process, controlling the atmosphere as described above must be performed at suitable timing so that secondary particles of composite hydroxide having the target particle structure are formed.

[Case of Performing Atmosphere Control Only One Time]

When trying to obtain secondary particles of composite hydroxide that include a center section, low-density layer and high-density layer by performing atmosphere control only one time, the crystallization reaction time of the initial state of the particle-growth process with respect to the total particle-growth process is preferably within the range 0.5% to 30%, and more preferably within the range 1% to 20%. In other words, the reaction atmosphere is switched from a non-oxidizing atmosphere to an oxidizing atmosphere by starting the introduction of oxidizing gas at a time from the start of the particle-growth process with respect to the total time of the particle-growth process preferably that is within the range 0.5% to 30%, and more preferably within the range 1% to 20%.

The introduction of oxidizing gas is performed directly into the reaction aqueous solution, so the time at which the atmosphere is switched from a non-oxidizing atmosphere to an oxidizing atmosphere is at about 0.5% to 2% with respect to the total time of the particle-growth process.

In the manufacturing method of the present invention, atmosphere gas is supplied directly into the reaction aqueous solution, so the atmosphere of the reaction field, in other words, the amount of oxygen that is dissolved in the reaction aqueous solution changes together with the oxygen concentration in the reaction tank with hardly any time difference. Therefore, the time for switching the atmosphere can be checked by measuring the oxygen concentration in the reaction tank. On the other hand, when atmosphere gas is supplied to spaces in the reaction tank, there is a time difference in the change of the amount of oxygen dissolved in the reaction aqueous solution and the oxygen concentration in the reaction tank, so it is not possible to check the amount of oxygen that is dissolved in the reaction aqueous solution until the oxygen concentration in the reaction tank becomes stable. In the present invention in which the atmosphere gas is directly supplied into the reaction aqueous solution, the time for switching the atmosphere that was checked according to the oxygen concentration inside the reaction tank can be regarded to be the time for switching the amount of oxygen dissolved in the reaction aqueous solution as the atmosphere of the reaction field.

Moreover, the crystallization reaction time in the oxidizing atmosphere after switching with respect to the total time of the particle-growth process is preferably within the range 1% to 25%, and more preferably within the range 1% to 20%. In other words, the atmosphere is switched from an oxidizing atmosphere to a non-oxidizing atmosphere by starting direct introduction of inert gas into the reaction aqueous solution at a time from the start of the introduction of oxidizing gas with respect to the total time of the particle-growth process that is preferably within the range 1% to 25%, and more preferably within the range 1% to 20%.

The time for switching from an oxidizing atmosphere to a non-oxidizing atmosphere is about 1% to 5% of the total time of the particle-growth process. Moreover, the crystallization reaction time after the final switching until the end of the particle-growth process in the non-oxidizing atmosphere (end of the crystallization reaction) is preferably within the range 50% to 98.5%, and more preferably within the range 50% to 80% with respect to the total time of the particle-growth process. By sequentially switching the reaction atmosphere at this kind of timing, it becomes possible to control the size of the center section and the thickness of the high-density layer to be within suitable ranges.

[Case of Performing Atmosphere Control Two or More Times]

When trying to obtain secondary particles of composite hydroxide having a structure that includes a center section and a combination of plural low-density layers and high-density layers by performing atmosphere control two or more times, the crystallization reaction time in the initial stage of the particle-growth process with respect to the entire time of the particle-growth process is preferably within the range 0.5% to 30%, and more preferably within the range 1% to 20%. In other words, the reaction atmosphere is switched from a non-oxidizing atmosphere to an oxidizing atmosphere by starting the direct introduction of oxidizing gas at a time from the start of the particle-growth process with respect to the total time of the particle-growth process preferably within a range of 0.5% to 30%, and more preferably within a range of 1% to 20%; then after that, the reaction atmosphere is switched from an oxidizing atmosphere to a non-oxidizing atmosphere by starting the direct introduction of an inert gas at a time from the start of the direct introduction of oxidizing gas with respect to the total time of the particle-growth process preferably within the range 0.5% to 20%, and more preferably within the range 0.5% to 15%; then furthermore, the reaction atmosphere is switched from a non-oxidizing atmosphere to an oxidizing atmosphere by restarting the direct introduction of oxidizing gas at a time from the start of direct introduction of inert gas with respect to the total time of the particle-growth process preferably within the range 5% to 40%, and more preferably within the range 5% to 35%; and after that the reaction atmosphere is switched from an oxidizing atmosphere to a non-oxidizing atmosphere by restarting the direct introduction of inert gas at a time from the restarting of direct introduction of oxidizing gas with respect to the total time of the particle-growth process preferably within a range of 0.5% to 20%, and more preferably within a range of 0.5% to 15%. The end of the particle-growth process in the non-oxidizing atmosphere after the final switching, or in other words, the crystallization reaction time up to the end of the crystallization reaction with respect to the total time of the particle-growth process is preferably within the range 40% to 80%, and more preferably within the range 50% to 70%.

In this case as well, the total crystallization reaction time in the oxidizing atmosphere in the particle-growth process with respect to the total time of the particle-growth process is preferably within the range 1% to 25%, and more preferably within the range 1% to 20%. By switching the reaction atmosphere at this kind of timing, it becomes possible to control the size of the center section and the thickness of the high-density layer within a suitable range.

d) Switching Method

Conventionally, switching the reaction atmosphere in the crystallization process is typically performed by circulating atmosphere gas inside the reaction tank, or more specifically in the gas-phase portion of the reaction tank, or inserting a pipe having an inner diameter of approximately 1 mm to 50 mm into the reaction aqueous solution and performing bubbling with atmosphere gas. In this conventional technique, switching the amount of oxygen dissolved in the reaction aqueous solution in a short time such as in the manufacturing method of the present invention is difficult, so it is necessary to stop the supply of raw material aqueous solution during switching from a non-oxidizing atmosphere to an oxidizing atmosphere in the particle-growth process. This is because when the supply of raw material aqueous solution is not stopped, gradual density gradients are formed inside the secondary particles of composite hydroxide, and it is considered to be impossible to make the low-density layer large enough.

In regard to this, a feature of the method for manufacturing composite hydroxide of the present invention is that when switching from a non-oxidizing atmosphere to oxidizing atmosphere, and switching from an oxidizing atmosphere to a non-oxidizing atmosphere in the particle-growth process the atmosphere is switched by directly supplying atmosphere gas into the reaction aqueous solution while maintaining the supply of raw material aqueous solution. In this kind of method, when switching the reaction atmosphere, the atmosphere of the reaction field in the reaction aqueous solution is in a mixed state in the non-oxidizing atmosphere region and the oxidizing atmosphere region, or is in a state of a boundary atmosphere having non-oxidizing characteristics and oxidizing characteristics, and is in a coming and going state of the non-oxidizing atmosphere and oxidizing atmosphere. As a result, together with being able to form a sufficiently large low-density layer inside the high-density layer or the between high-density layers on the outside of the center section, it becomes possible to generate both plate-shaped primary particles and fine particles, and obtain secondary particles of composite hydroxide having particle structure that includes a low-density layer inside of which there is a high-density section. Moreover, when switching the reaction atmosphere, it is not necessary to stop the supply of raw material aqueous solution, so it is also possible to improve productivity.

The time required to switch the reaction atmosphere by directly introducing oxidizing gas or inert gas into the reaction aqueous solution (switching time) is not limited as long as it is possible to obtain secondary particles of composite hydroxide having the structure described above, however, as described above, normally, the switching time for switching from a non-oxidizing atmosphere to an oxidizing atmosphere by directly introducing oxidizing gas is about 0.5% to 2% with respect to the total time of the particle-growth process, and the switching time for switching from the oxidizing atmosphere to a non-oxidizing atmosphere by directly introducing inert gas is about 1% to 5% with respect to the total time of the particle growth process.

Here, the method for supplying atmosphere gas to the reaction aqueous solution must be a method capable of directly supplying atmosphere gas to the reaction aqueous solution. As this kind of method, for example, preferably a diffusing pipe is used. A diffusing pipe is configured with a pipe that has multiple fine holes (mesh) on the surface, and is capable of releasing a lot of fine gas (bubbles) into the solution, so the contact surface are between the reaction aqueous solution and the bubbles is large, and thus it is possible to easily control the switching time according to the amount of atmosphere gas supplied.

As this kind of diffusing pipe preferably a ceramic pipe that has excellent resistance to high pH environments is used. Moreover, the smaller the diameter of the diffusing pipe is, the finer the bubbles are that can be released, so it becomes possible to switch the reaction atmosphere with high efficiency. In the present invention, preferably a diffusing pipe having mesh with a hole diameter of 100 µm or less is used, and more preferably a diffusing pipe having mesh with a hole diameter of 50 µm or less is used.

The supply of atmosphere gas should generate fine bubbles and increase the contact surface area between the reaction aqueous solution as described above, and even in a method other than a diffusing pipe as described above, as long as bubbles are generated from the hole of a pipe, and those bubbles are finely broken up and dispersed by stirring blades or the like, the atmosphere can be similarly switched with high efficiency.

(5) Ammonium Ion Concentration

The ammonium ion concentration in the reaction aqueous solution is maintained at a constant value preferably within the range 3 g/L to 25 g/L, and more preferably 5 g/L to 20 g/L. In the reaction aqueous solution, the ammonium ions function as a complexing agent, so when the ammonium ion concentration is less than 3 g/L, it is not possible to keep the solubility of the metal ions constant, and it becomes easy for the reaction aqueous solution to become a gel, so it becomes difficult to obtain secondary particles of composite hydroxide having a uniform shape and particle size. On the other hand, when the ammonium ion concentration is greater than 25 g/L, the solubility of the metal ions becomes too large, so the amount of metal ions remaining in the reaction aqueous solution increases, which causes deviations in the composition.

When the ammonium ion concentration varies during the crystallization reaction, the solubility of metal ions varies, and secondary particles of composite hydroxide having a uniform composition are not formed. Therefore, preferably the range of variation of the ammonium ion concentration is controlled to be within a fixed range by the nucleation process and particle-growth process, and more specifically the range of variation is preferably controlled to be within the range ±5 g/L.

(6) Reaction Temperature

The temperature (reaction temperature) of the reaction aqueous solution must be controlled by the nucleation process and particle-growth process to preferably be 20° C. or greater, and more preferably is controlled to be within the range 20° C. to 60° C. When the reaction temperature is less than 20° C., the solubility of the reaction aqueous solution is caused to decrease and it becomes easy for nucleation to occur, and thus it becomes difficult to control the average particle size and particle size distribution of the secondary particles of composite hydroxide that is obtained. The upper limit of the reaction temperature is not particularly limited, however when the reaction temperature is greater than 60° C., volatilization of ammonia is promoted, so the amount of aqueous solution that includes an ammonium ion donor that is supplied in order to control the amount of ammonium ions in the reaction aqueous solution to a fixed range increases, which causes the production cost to increase.

(7) Coating Process

In the method for producing composite hydroxide of the present invention, it is possible to obtain composite hydroxide in which additional element(s) (M) are uniformly dispersed into the secondary particles by adding compounds that include additional element(s) (M) to the raw material aqueous solution. However, when trying to obtain the effect of adding additional element(s) (M) by adding a smaller amount, preferably a coating process is performed after the particle-growth process that coats the surface of the secondary particles of composite hydroxide with compounds that include the additional element(s) (M).

The coating method is not particularly limited as long as it is possible to uniformly coat the secondary particles of composite hydroxide with compounds that include the additional element(s) (M). For example, it is possible to obtain secondary particles of composite hydroxide that are uniformly coated with compounds that include additional element(s) (M) by making a slurry of the composite hydroxide, and controlling the pH value of that slurry to be within a specified range, then adding an aqueous solution in which compounds that include the additional element(s) (M) are dissolved to the slurry of composite hydroxide and causing the compounds that include the additional element(s) (M) to precipitate out onto the surface of the secondary particles. In this case, instead of a coating aqueous solution, an alkoxide solution of the additional element(s) (M) may be added to the slurry of composite hydroxide. Moreover, without making a slurry of the composite hydroxide, the secondary particles may be coated by spraying an aqueous solution or slurry in which compounds that include the additional element(s) (M) are dissolved onto the composite hydroxide and then drying the composite hydroxide. Furthermore, it is also possible to coat the secondary particles by a method of spraying and drying a slurry in which the composite hydroxide and compounds that include the additional element(s) (M) are suspended, or by a method of mixing the composite hydroxide and compounds that include the additional element(s) (M) using a solid phase method.

When coating the surface of secondary particles of composite hydroxide with additional element(s) (M), the composition of the raw material aqueous solution and coating aqueous solution must be appropriately adjusted so that the composition of the composite hydroxide after the coating process coincides with the composition of the target composite hydroxide. Moreover, the coating process may be performed on heat-treated particles after heat treating the composite hydroxide.

(8) Producing Equipment

The crystallization equipment (reaction tank) for producing the composite hydroxide of the present invention is not particularly limited as long as it is possible to perform switching of the reaction atmosphere by the diffusion pipe described above. However, preferably batch-type crystallization equipment that does not recover the precipitated product until the crystallization process ends is used. With this kind of crystallization equipment, differing from continuous-type crystallization equipment that recovers product by an overflow method, the particles being grown are not recovered at the same time as the overflow liquid, so it is possible to easily obtain a composite hydroxide that includes secondary particles having a narrow particle size distribution. Moreover, in the method for manufacturing composite hydroxide of the present invention, it is necessary to suitably control the reaction atmosphere during the crystallization process, so preferably sealed crystallization equipment is used.

2. Positive Electrode Active Material for a Non-Aqueous Electrolyte Secondary Battery 2-1. Positive Electrode Active Material for a Non-Aqueous Electrolyte Secondary Battery (1) Particle Structure a) Secondary Particle Structure The positive electrode active material of the present invention includes secondary particles that are formed from an aggregate of plural primary particles. A feature of these secondary particles is that the secondary particles include an outer-shell section that is an aggregate of primary particles, at least one aggregate section that is an aggregate of primary particles and that exists inside the outer-shell section and is electrically and structurally connected to the outer-shell section, and at least one space section in which there are no primary particles and that exists inside the outer-shell section. Here, being "electrically and structurally connected" means that the outer-shell section and the aggregate sections of primary particles, and aggregate sections of primary particles are structurally connected by a structure such as connecting sections between these, and are in a state in which electrical conduction is possible. Moreover, an "aggregate section of primary particles" means a portion in which a high-density layer is sintered and contracted and is a portion other than a portion that forms the center section of secondary particles of the precursor composite hydroxide and outer-shell section; and "connecting section" means a portion of a low-density layer in which a high-density section is sintered and contracted.

In positive electrode active material having this kind of particle structure, electrolyte penetrates into the secondary particles via grain boundaries or spaces between primary particles, so it becomes possible for lithium to be desorbed and adsorbed by not only the surface of the secondary particles, but also inside the secondary particles. Moreover, in this positive electrode active material, the outer-shell sections and the aggregate sections are electrically and structurally connected, and the surface area inside the secondary particles is sufficiently large, so when compared with the positive electrode active material described in WO2014/181891, it is possible to greatly reduce the resistance inside the particles (internal resistance). Furthermore, due to the existence of connecting sections, it is possible to increase the particle density while increasing the particle strength. Therefore, in a secondary battery that uses this positive electrode active material, it is possible to simultaneously improve the output characteristics, battery capacity and cycling characteristics.

The center section of the positive electrode active material of the present invention does not necessarily coincide with the center section of the secondary particles of composite hydroxide. The reason for this is not clear, however, is presumed to be because contacts (connecting sections) exist between high-density layers, or because high-density sections that connect together high-density layers exist randomly inside the secondary particles of composite hydroxide, which make contraction of secondary particles during calcination occur unevenly. Moreover, it is presumed that because in the secondary particles of composite hydroxide, the center section of the secondary particles is connected with the high-density layers and high-density sections, it becomes easy for the center sections to be affected by the deformation of the secondary particles during calcination. Therefore, in the positive electrode active material of the present invention, there are various structures such as: a) structure that includes an outer-shell section, at least one aggregate section of primary particles, at least one space section, and a connecting section that connects the outer-shell section and the aggregate section; b) structure that includes a center section composed of an aggregate section of primary particles, an outer-shell section, and a connecting section that connects the center section and outer-shell section; and c) structure that includes an outer-shell section, an inner-shell section inside the outer-shell structure, at least one aggregate section of primary particles inside the inner-shell section, a space section between the outer-shell section and the inner-shell section, a space section inside the inner-shell section, and connecting sections that connect the outer-shell section, inner-shell section and aggregate sections of primary particles. Moreover, in this case, the center section, inner-shell section, outer-shell section are all configured with plural aggregate sections that are electrically and structurally connected together. Furthermore, positive electrode active material that has a structure in which the connecting section(s) is integrated with the outer-shell section and an aggregate section (including a center section and/or an inner-shell section), and the outer-shell section and aggregate section are essentially directly linked and electrically connected. In this case, the contact section between the outer-shell section and aggregate section is interpreted as a connecting section.

In the explanation below, reference to the fact that the particle characteristic of the positive electrode active material are secondary particles is omitted.

b) Outer-Shell Section

In the positive electrode active material of the present invention, the ratio of the thickness of the outer-shell section with respect to the particle size (hereafter, referred to as "outer-shell section particle size ratio") is preferably within the range 5% to 25%, and more preferably within the range 5% to 20%, and even more preferably within the range 5% to 15%. As a result, in a secondary battery that uses this positive electrode active material, it becomes possible to improve the output characteristics without a deterioration of the battery capacity or cycling characteristics. However, when the outer-shell section particle size ratio is less than 5%, it becomes difficult to maintain particle strength and durability of the positive electrode active material, and there is a possibility that the cycling characteristics of the secondary battery will decrease. On the other hand, when the outer-shell section particle size ratio is greater than 25%, the ratio of the space section decreases, so there is a possibility that it will become difficult to improve the output characteristics of the secondary battery.

Here, the outer-shell section particle size ratio can be found in the following way by using a cross-section SEM photo of the positive electrode active material. First, on a cross-section SEM photo, the thickness of the outer-shell section is measured at three or more arbitrary positions per particle, and the average value is found. Here, the thickness of the outer-shell section is the distance between two points that is the shortest distance from the perimeter of the positive electrode active material to the boundary between the outer-shell section and the space. At the same time, the maximum distance between two points on the perimeter of the positive electrode active material is measured, and this value is taken to be the particle size of the positive electrode active material. Then, by dividing the thickness of the outer-shell section by the particle size of the positive electrode active material, the ratio of the thickness of the outer-shell section with respect to the particle size of the positive electrode active material is found. Similar measurement is performed for ten or more particles of positive electrode active material, and by calculating the average value it is possible to find the outer-shell section particle size ratio. In the positive electrode active material of the present invention, part of the outer-shell section is released by contraction during calcination, and there is a possibility that the space section inside the outer-shell section will be exposed to the outside. In such a case, the outer-shell section is determined by presuming that the release portion is connected, and the thickness of the outer-shell section can be measured by measuring the measurable portion.

c) Space Section

A feature of the positive electrode active material of the present invention is that space sections are dispersed on the inside of the outer-shell section, however, at an arbitrary cross section of the positive electrode active material, the ratio of the surface area of the space section with respect to the surface area of the outer-shell section and aggregate section of primary particles (hereafter, referred to as the "space section ratio") is preferably within the range 20% to 60%, and more preferably within the range 30% to 50%. As a result, in a secondary battery that uses this positive electrode active material, it becomes possible to simultaneously improve the output characteristics, the battery capacity and the cycling characteristics. However, when the space section ratio is less than 20%, there is a possibility that it will not be possible to improve the output characteristics of the secondary battery. On the other hand, when the space section ratio is greater than 60%, the particle density and particle strength decreases, so there is a possibility that it may not be possible to maintain the battery capacity and cycling characteristics of the secondary battery.

The space section ratio can be found using cross-section SEM observation by finding the area ratio of the outer-shell section and aggregate section of primary particles (white sections or light gray sections in FIG. 2) with respect to the space section (black sections in FIG. 2) for ten or more arbitrary secondary particles of positive electrode active material, and then calculating the average value of these.

(2) Average Particle Size

The positive electrode active material of the present invention is adjusted so that the average particle size is within the range 1 μm to 15 μm, and preferably within the range 3 μm to 12 μm, and more preferably within the range 3 μm to 10 μm. When the average particle size of the positive electrode active material is within this kind of range, not only is it possible to increase the battery capacity per unit volume of a secondary battery that uses this positive electrode active material, it is also possible to improve the safe performance and output characteristic. However, when the average particle size is less than 1 μm, the filling property of the positive electrode active material decreases, and it is not possible to increase the battery capacity per unit volume. On the other hand, when the average particle size is greater than 15 μm, the reaction surface area of the positive electrode active material decreases, and the interface with the electrolyte decreases, so it becomes difficult to improve the output characteristics.

The average particle size of the positive electrode active material, as in the case of the secondary particles of the composite hydroxide described above, means the volume standard average particle size (MV), and for example, can be found from the volume integrated value that is measured with a laser diffraction scattering type particle size analyzer.

(3) Particle Size Distribution

For the positive electrode active material of the present invention, the index [(d90−s10)/average particle size] that indicates the spread of the particle size distribution is 0.7 or less, and preferably is 0.6 or less, and more preferably is 0.55 or less, so the particle size distribution of the positive electrode active material of the present invention is very narrow. In this kind of positive electrode active material, the proportion of fine particles and coarse particles is small, and a secondary battery that uses this positive electrode active material has excellent safety, cycling characteristics and output characteristics.

However, when the index [(d90−s10)/average particle size] is greater than 0.7, the proportion of fine particles and coarse particles in the positive electrode active material increases. For example, in a secondary battery that uses a positive electrode active material having a large proportion of fine particles, not only does it becomes easy for the secondary battery to generate heat and for safety to decrease due to local reaction of fine particles, the cycling characteristics deteriorate due to selective deterioration of fine particles. Moreover, in a secondary battery that uses a positive electrode active material having a large proportion of coarse particles, it is not possible to sufficiently maintain the reaction surface area between the electrolyte and the positive electrode active material, and the output characteristics deteriorate. When production is presumed to be on an industrial scale, using a positive electrode active material having an index [(d90−s10)/average particle size] that is excessively small is not practical. Therefore, when cost and productivity are taken into consideration, the lower limit value of the index [(d90−s10)/average particle size] is preferably about 0.25.

In the index [(d90−s10)/average particle size] that indicates the spread of the particle size distribution, the meaning of d10 and d90 and the method for finding these is the same as in the case of secondary particles of composited hydroxide described above, so an explanation here is omitted.

(4) Surface Area Per Unit Volume

The surface area per unit volume of the positive electrode active material of the present invention must be 1.7 m$^2$/cm$^3$ or greater, and preferably 2.1 m$^2$/cm$^3$ or greater. As a result, it is possible to increase the contact surface area with the electrolyte while maintaining the filling property of the positive electrode active material, so it is possible to improve the output characteristics and battery capacity at the same time. The surface are per volume can be found by taking the product of the BET specific surface area and the tap density that will be described later.

Typically, as the tap density becomes large, the BET specific surface area becomes small, and when the tap density becomes small the BET specific surface area becomes large. Therefore, increasing the BET specific surface area without decreasing the tap density is difficult. However, by the positive electrode active material of the present invention having particle structure such as described above, it is possible to increase the BET specific surface area without decreasing the tap density.

(5) Composition

The composition of the positive electrode active material of the present invention is not limited as long as the positive electrode active material has the particle structure described above. In other words, a feature of the present invention is the particle structure, average particle size and particle size distribution of the positive electrode active material, and the present invention can be widely applied to positive electrode active material composed of a composite oxide that includes at least a transition metal, and more specifically, includes as the main transition metal one kind of transition metal selected from among nickel (Ni), manganese (Mn) and cobalt (Co). Moreover, in addition to the main transition metal, the positive electrode active material of the present invention may include other transition metals or other metals besides this.

However, the positive electrode active material of the present invention preferably includes a composite oxide having nickel, nickel and manganese, or nickel and manganese and cobalt as the main component, and particularly, the present invention can be suitably applied to a positive electrode active material that is expressed by the general formula (B): $Li_{1+u}Ni_xMn_yCo_zM_tO_2$ (where, −0.05≤u≤0.50, x+y+z+t=1, 0.3≤x≤0.95, 0.05≤y≤0.55, 0≤z≤0.4, 0≤t≤0.1, and M is at least one additional element selected from among Mg, Ca, Al, Ti, V, Cr, Zr, Nb, Mo, Hf, Ta and W).

In this positive electrode active material, the value of u that indicates the excess amount of lithium (Li) is preferably no less than −0.05 and no greater than 0.50, and more preferably is no less than 0 and no greater than 0.50, and even more preferably is no less than 0 and no greater than 0.35. By regulating the value of u within the range above, it is possible to improve the output characteristic and battery capacity of a secondary battery that uses this positive electrode active material as a positive electrode material. However, when the value of u is less than −0.05, the positive electrode resistance of the secondary battery becomes large, so it is not possible to improve the output characteristics. On the other hand, when the value of u is greater than 0.50, not only does the initial discharge capacity decrease, but the positive electrode resistance also becomes large.

Nickel (Ni) is an element that contributes to increasing the potential and capacity of a secondary battery, and the value x that indicates the amount of nickel included is preferably no less than 0.3 and no greater than 0.95, and more preferably is no less than 0.3 and no greater than 0.9. When the value of x is less than 0.3, it is not possible to improve the battery capacity of a secondary battery that uses this positive electrode active material. On the other hand, when the value of x is greater than 0.95, the amounts that other elements are included decrease, and it is not possible to obtain the effects of those elements.

Manganese (Mn) is an element that contributes to the improvement of thermal stability, and the value of y that indicates the amount of manganese included is preferably no less than 0.05 and no greater than 0.55, and more preferably is no less than 0.10 and no greater than 0.40. When the value of y is less than 0.05, it is not possible to improve the thermal stability of a secondary battery that uses this positive electrode active material. On the other hand, when the value of y is greater than 0.55, Mn is eluted from the positive electrode active material during high-temperature operation, and the charge/discharge cycling characteristic deteriorates.

Cobalt (Co) is an element that contributes to the improvement of the charge/discharge cycling characteristics, and the value z that indicates the amount of cobalt included is preferably no less than 0 and no greater than 0.4, and more preferably is no less than 0.10 and no greater than 0.35. When the value of z is greater than 0.4, the initial discharge capacity of a secondary battery that uses this positive electrode active material greatly decreases.

The positive electrode active material of the present invention may also include additional element(s) (M) in addition to the metal elements described above in order to further improve the durability and output characteristics of the secondary battery. As such additional element(s) (M), it is possible to use at least one additional element selected from among magnesium (Mg), calcium (Ca), aluminum (Al), titanium (Ti), vanadium (V), chrome (Cr), zirconium (Zr), niobium (Nb), molybdenum (Mo), halfnium (Hf), tantalum (Ta), and tungsten (W).

The value of t that indicates the amount of additional element(s) (M) included is preferably no less than 0 and no greater than 0.1, and more preferably is no less than 0.001 and no greater than 0.05. When the value of t is greater than 0.1, the metal elements that contribute to the Redox reaction are decreased, so the battery capacity decreases.

Additional element(s) (M) such as these may be uniformly dispersed into the particles of positive electrode active material, and may be coated on the surface of the particles of the positive electrode active material. Furthermore, after uniformly dispersing additional element(s) (M) into the particles, the surface of the particles may be coated. In any method used, the amounts of additional element(s) (M) included must be controlled so as to be within the range above.

In the case of the positive electrode active material described above, in order to further improve the battery capacity of a secondary battery that uses this positive electrode active material, the composition is preferably adjusted so as to be expressed by the general formula (B1): $Li_{1+u}Ni_xMn_yCo_zM_tO_2$ (where, $-0.05 \leq u \leq 0.20$, $x+y+z+t=1$, $0.7 \leq x \leq 0.95$, $0.05 \leq y \leq 0.1$, $0 \leq z \leq 0.2$, $0 \leq t \leq 0.1$, and M is at least one additional element selected from among Mg, Ca, Al, Ti, V, Cr, Zr, Nb, Mo, and W). Particularly, in order to achieve compatibility with thermal stability, preferably the value of x in the general formula (B1) is $0.7 \leq x \leq 0.9$, and more preferably $0.7 \leq x \leq 0.85$.

On the other hand, in order to further improve thermal stability, the composition is preferably adjusted so as to be expressed by the general formula (B2): $Li_{1-u}Ni_xMn_yCo_zM_tO_2$ (where, $-0.05 \leq u \leq 0.50$, $x+y+z+t=1$, $0.3 \leq x \leq 0.7$, $0.1 \leq y \leq 0.55$, $0 \leq z \leq 0.4$, $0 \leq t \leq 0.1$, and M is at least one additional element selected from among Al, Ti, V, Cr, Zr, Nb, Mo, Hf, Ta and W).

(6) BET Specific Surface Area

In the case of the positive electrode active material of the present invention, the BET specific surface area is preferably within the range 0.7 m$^2$/g to 5.0 m$^2$/g, and more preferably within the range 1.8 m$^2$/g to 5.0 m$^2$/g. In the case of positive electrode active material of which the BET specific surface area is within this kind of range, the contact surface area with the electrolyte is large, and it is possible to greatly improve the output characteristics of a secondary battery that uses this positive electrode active material. However, when the BET specific surface area of positive electrode active material is less than 0.7 m$^2$/g, when configuring a secondary battery, it is not possible to maintain the reaction surface area with the electrolyte, and it becomes difficult to sufficiently improve the output characteristics. On the other hand, when the BET specific surface area of positive electrode active material is greater than 5.0 m$^2$/g, the reactivity with the electrolyte becomes too high, so there is a possibility that thermal stability will decrease.

The BET specific surface area of the positive electrode active material can be measured, for example, by a BET method using nitrogen gas adsorption.

(7) Tap Density

In order to extend the time of use of a portable electronic device or the traveling distance of an electric automobile, increasing the capacity of a secondary battery has become an important issue. On the other hand, from aspect of packing the entire battery or electron conductivity of the battery, the thickness of the electrodes of a secondary battery is required to be about several microns thick. Therefore, not only must a positive electrode active material having high capacity be used as the positive electrode active material, but being able to increase the filling property of the positive electrode active material, and increase the volume of the overall secondary battery is also necessary. From this aspect, in the positive electrode active material of the present invention, the tap density that is an index of the filling property is preferably 1.0 g/cm$^3$ or more, and more preferably 1.3 g/cm$^3$ or more. When the tap density is less than 1.0 g/cm$^3$, the filling property is low, and it may not be possible to sufficiently improve the battery capacity of the overall secondary battery. On the other hand, the upper limit of the tap density is not particularly limited, however, under normal production conditions the upper limit becomes about 3.0 g/cm$^3$.

The tap density, based on JIS Z-2504, expresses the bulk density after tapping specimen powder that is collected in a container 100 times, and the tap density can be measured by using a shaking specific gravity meter.

2-2. Method for Producing Positive Electrode Active Material for a Non-Aqueous Electrolyte Secondary Battery The method for producing positive electrode active material of the present invention is not particularly limited as long as the composite hydroxide described above is used as a precursor, and the positive electrode active material that has a specified particle structure, average particle size and particle size distribution can be synthesized. However, when production on an industrial scale is presumed, preferably positive electrode active material is synthesized by a manufacturing method that includes a mixing process for obtaining a lithium mixture by mixing the composite hydroxide described above with a lithium compound, and a calcination process for performing calcination of the obtained lithium mixture in an oxidizing atmosphere at a temperature within the range 650° C. to 980° C. As necessary, processes such as a heat-treatment process, a pre-calcination process and like can be added to the processes above. With this manufacturing method, the positive electrode active material described above, and particularly, the positive electrode active material expressed by the general formula (B) can easily be obtained.

(1) Heat-Treatment Process

In the method for producing positive electrode active material of the present invention, a heat-treatment process may be provided arbitrarily before the mixing process, and the composite hydroxide may be mixed with a lithium compound after as heat-treated particles. Here, not only composite hydroxide from which excess moisture has been removed in a heat-treatment process, but also transition metal-containing composite oxide that has been converted from a hydroxide to an oxide by a heat-treatment process (hereafter, referred to as "composite oxide"), or a combination of these are included in the heat-treated particles.

The heat-treatment process is a process for removing excess moisture that is included in the composite hydroxide by performing heat treatment by heating the composite hydroxide to a temperature within a range of 105° C. to 750° C. As a result, it is possible to reduce the moisture remaining up until after the calcination process to a fixed amount, and it is possible to suppress variation in the composition of the obtained positive electrode active material.

The heating temperature in the heat-treatment process is in the range 105° C. to 750° C. When the heating temperature is less than 105° C., it is not possible to remove the excess moisture in the composite hydroxide, so it may not be possible to sufficiently suppress variation. On the other hand, even when the heating temperature is greater than 750° C., no further effect can be expected, and the production cost increases.

In the heat-treatment process, as long as it is possible to remove enough moisture so that variation does not occur in the proportion of the respective number of atoms of metal component and number of atoms of Li in the positive electrode active material, it is not absolutely necessary to convert all of the composite hydroxide to a composite oxide. However, in order to further reduce variation in the proportion of the respective number of atoms of metal component and number of atoms of Li, preferably heating is performed at 400° C. or greater, and all of the composite hydroxide is converted to composite oxide. It is possible to further suppress the variation described above by performing analysis beforehand to find the metal component included in the composite hydroxide according to the heat-treatment conditions, and determining the mixing ratio with the lithium compound.

The atmosphere in which heat treatment is performed is not particularly limited, and as long as the atmosphere is a non-reducing atmosphere, preferably is performed in air circulation that can be easily performed.

Moreover, the heat treatment time is not particularly limited, however, from the aspect of sufficiently removing excess moisture in the composite hydroxide, preferably is performed for at least one hour, and more preferably is performed within the range of 5 hours to 15 hours.

(2) Mixing Process

The mixing process is a process for obtaining a lithium mixture by mixing a lithium compound with composite hydroxide or heat-treated particles described above.

In the mixing process, it is necessary to mix the composite hydroxide or heat-treated particles with a lithium compound so that the ratio (Li/Me) of the total number of atoms (Me) of metal atoms other than lithium in the lithium mixture, and more specifically, nickel, cobalt manganese and additional element(s) (M), and the number of atoms of lithium (Li) is within the range 0.95 to 1.5, and preferably within the range 1.0 to 1.5, and more preferably within the range 1.0 to 1.35, and even more preferably within the range 1.0 to 1.2. In other words, the ratio Li/Me does not change before or after the calcination process, so the composite hydroxide or heat-treated particles and the lithium compound must be mixed in the mixing process so that the ratio Li/Me becomes the target ratio Li/Me of the positive electrode active material.

The lithium compound that is used in the mixing process is not particularly limited, however, from the aspect of ease of procurement, preferably lithium hydroxide, lithium nitrate, lithium carbonate or a mixture of these used. Particularly, in considering the ease of handling and the stability of quality, using lithium hydroxide or lithium carbonate is preferred.

Preferably the composite hydroxide or heat-treated particles and the lithium compound are sufficiently mixed so no fine powder occurs. When mixing is not sufficient, variation in the ratio Li/Me occurs between individual particles, and it may not be possible to obtain sufficient battery characteristics. A typical mixer can be used for mixing. For example, a shaker mixer, a Löedige mixer, a Julia mixer, a V blender and the like can be used.

(3) Pre-Calcination Process

When using lithium hydroxide and lithium carbonate as the lithium mixture, a pre-calcination process may be performed after the mixing process and before the calcination process to pre-calcine the lithium mixture at a temperature that is lower than the calcination temperature described later, and that is a temperature within the range 350° C. to 800° C., and more preferably a temperature within the range 450° C. to 780° C. As a result, it is possible to sufficiently diffuse lithium into the secondary particles of composite hydroxide or the heat-treated particles, and thus it is possible to obtain a lithium composite oxide that has a more uniform composition.

The amount of time maintained at the temperature above is preferably within the range 1 hour to 10 hours, and more preferably within the range 3 hours to 6 hours. Moreover, the atmosphere in the pre-calcination process, as in the calcination process that will be described later, is preferably an oxidizing atmosphere, and preferably is an atmosphere in which the oxygen concentration is within the range 18% by volume to 100% by volume.

(4) Calcination Process

The calcination process is a process for obtaining positive electrode active material that includes lithium composite oxide by performing calcination of the lithium mixture that is obtained in the mixing process under specified conditions, and diffusing lithium into the secondary particles of composite hydroxide or the heat-treated particles.

In this calcination process, the center section and high-density layer of the secondary particles of composite hydroxide or the heat-treated particles are sintered and contract, forming an outer-shell section and aggregate sections of primary particles in the positive electrode active material. On the other hand, the low-density layer includes fine primary particles, so sintering begins from a lower temperature region than the center section and high-density layer that includes plate-shaped primary particles that are larger than these fine primary particles. However, the amount of contraction of the low-density layer is larger than the center section and high-density layer. Therefore, the fine primary particles of the low-density layer contracts toward the center section and high-density layer side where sintering progresses slowly, so a space section having a suitable size are formed. When this happens, the high-density section inside the low-density layer is maintained and is connected with the center section and high-density layer, so in the obtained positive electrode active material, the outer-shell section and aggregate section of primary particles are electrically connected, and it is possible to sufficiently maintain the cross-sectional area of that path. As a result, the internal resistance of the positive electrode active material greatly decreases, and when configuring a secondary battery, it becomes possible to improve the output characteristics without impairing the battery capacity and cycling characteristics.

The particle structure of this kind of positive electrode active material is basically determined according to the particle structure of the secondary particles of the precursor composite hydroxide, however, the particle structure is affected by the composition and calcination conditions, so preferably, after performing preliminary testing, the calcination conditions are adjusted as necessary according to the composition so a desired particle structure is obtained.

The furnace that is used in the calcination process is not particularly limited, and any furnace may be used as long as it is possible to heat the lithium mixture in a circulated flow of air or oxygen. However, from the aspect of uniformly maintaining the atmosphere inside the furnace, preferably an electric furnace in which gas is not generated is used, and either a batch type or continuous type electric furnace can be suitably used. In regard to this point, the same is true for the furnace that is used in the heat-treatment process and pre-calcination process.

a) Calcination Temperature

The calcination temperature of the lithium mixture must be within the range 650° C. to 980° C. When the calcination temperature is less than 650° C., lithium is not sufficiently diffused into the composite hydroxide or the heat-treated particles, excess lithium and unreacted composite hydroxide or heat-treated particles remain, and the crystallinity of the obtained lithium composite oxide is not sufficient. On the other hand, when the calcination temperature is greater than 980° C., severe sintering occurs between the particles of the lithium composite oxide, which causes abnormal particle growth to occur, and the proportion of irregular shaped coarse particles increases.

When trying to obtain the positive electrode active material that is expressed by the general formula (B1) described above, preferably the calcination temperature is within the range 650° C. to 900° C. On the other hand, when trying to obtain the positive electrode active material that is expressed by the general formula (B2) described above, preferably the calcination temperature is within the range 800° C. to 980° C.

Moreover, the rate of temperature rise in the calcination process is preferably within the range 2° C./min to 10° C./min, and more preferably within the range 5° C./min to 10° C./min. Furthermore, during the calcination process, the temperature is maintained at a temperature near the melting point of the lithium compound preferably for 1 hour to 5 hours, and more preferably for 2 hours to 5 hours. As a result, it is possible to more uniformly cause the composite hydroxide or heat-treated particles to react with the lithium compound.

b) Calcination Time

Of the calcination time, the amount of time that the temperature is maintained (maintenance time) at the calcination temperature described above is preferably at least 2 hours, and more preferably 4 hours to 24 hours. When the maintenance time at the calcination temperature is less than 2 hours, lithium will not be sufficiently diffused into the composite hydroxide or the heat-treated particles, and there is a possibility that excess lithium and unreacted composite hydroxide or heat-treated particles will remain, and that the crystallinity of the obtained lithium compound will be insufficient.

After the maintenance time has ended, the rate of cooling from the calcination temperature to at least 200° C. is preferably within the range 2° C./min to 10° C./min, and more preferably within the range 3° C./min to 7° C./min. By controlling the rate of cooling to be within such a range, it is possible to maintain productivity while at the same time prevent damage to equipment such as the saggar and the like.

c) Calcination Atmosphere

The atmosphere during calcination is preferably an oxidizing atmosphere, and preferably is an atmosphere in which the oxygen concentration is within the range 18% by volume to 100% by volume, and a mixed atmosphere of oxygen at that oxygen concentration and an inert gas is particularly preferred. In other words, calcination is preferably performed in an atmosphere of a flow of air or oxygen. When the oxygen concentration is less than 18% by volume, there is a possibility that the crystallinity of the lithium composite oxide will be insufficient.

(5) Crushing Process

In the lithium composite oxide that is obtained in the calcination process, aggregation or light sintering among the particles may occur. In such a case, the aggregates or sintered bodies of lithium composite oxide are preferably crushed. By doing so it is possible to adjust the average particle size and particle size distribution of the positive electrode active material obtained to be within a suitable range. Crushing is an operation of loosening up aggregate bodies by applying mechanical energy to the aggregate bodies that occurred due to sintering necking among particles during calcination, and separating the aggregate bodies without damaging the particles themselves.

As the crushing method, it is possible to use a known method; for example, it is possible to use a pin mill, hammer mill or the like. When doing this, preferably the crushing force is suitably adjusted within a range so that the particles themselves are not damaged.

3. Non-Aqueous Electrolyte Secondary Battery

The non-aqueous electrolyte secondary battery of the present invention includes components that are the same as those of a typical non-aqueous electrolyte secondary battery such as a positive electrode, negative electrode, separator, non-aqueous electrolyte and the like. The embodiment that is explained below is only an example, and the present invention can also be applied to non-aqueous electrolyte secondary batteries that have undergone various modifications and improvements based on the embodiment described in this specification.

(1) Components a) Positive Electrode

The positive electrode of a non-aqueous electrolyte secondary battery is made as describe below, for example, using the positive electrode active material described above.

First, a conductive material and binding agent are mixed into the positive electrode active material of the present invention, and as needed, activated carbon, a solvent for controlling viscosity and the like are further added, then these ingredients are kneaded to make a positive electrode composite paste. When doing this, the mixing ratios of the respective ingredients in the positive electrode composite paste become an important factor for determining the performance of the non-aqueous electrolyte secondary battery. For example, when the solid content of the positive electrode composite after removing the solvent is taken to be 100 parts by mass, as in the case of a typical non-aqueous electrolyte secondary battery, the amount of positive electrode active material included can be taken to be within the range 60 parts by mass to 95 parts by mass, and the amount of conductive material included can be taken to be within the range 1 part by mass to 20 parts by mass, and the amount of binding agent include can be taken to be within the range 1 part by mass to 20 parts by mass.

The positive electrode composite paste that is obtained is applied to the surface of a current collector that is made of aluminum foil, then dried to allow the solvent to scatter. As necessary, in order to increase the positive electrode density, pressure may be applied using a roll press or the like. In this way, it is possible to make a sheet-like positive electrode. A sheet-like positive electrode can be provided for producing a battery by cutting the sheet into a suitable size according to the target battery. The method for producing a positive electrode is not limited to this example, and other methods may also be used.

As the conductive material, it is possible for example to use graphite (natural graphite, artificial graphite, expanded graphite, and the like), or a carbon black material such as acetylene black, ketjen black and the like.

The binding agent serves the role of binding together positive electrode particles, and for example, it is possible to use polyvinylidene fluoride (PVDF), polytetrafluoroethylene (PTFE), fluororubber, ethylene propylene diene rubber, styrene butadiene, cellulose resin, or polyacrylic acid.

In addition, as necessary it is possible to add a solvent to the positive electrode composite material to disperse the positive electrode active material, conductive material and activated carbon, and dissolve the binding agent. As the solvent, it is possible to use an organic solvent such as N-methyl-2-pyrrolidone and the like. Moreover, in order to increase the electric double layer capacity, it is possible to add activated carbon to the positive electrode composite material.

b) Negative Electrode

It is possible to use metallic lithium or a lithium alloy for the negative electrode. Moreover, it is also possible to use a negative electrode that is formed by applying a negative electrode composite material paste that is formed by mixing a binding agent with a negative electrode active material that is capable of adsorption and desorption of lithium ions and adding a suitable solvent to the surface of a metal foil current collector such as a copper foil current collector, drying the paste, and then as necessary applying pressure to increase the electrode density.

As the negative electrode active material, it is possible to use a material that includes lithium such as metallic lithium, lithium alloy or the like, an organic compound sintered body such as natural graphite, artificial graphite, phenol resin and the like that is capable of adsorption and desorption of lithium ions, and a carbon powder material such as coke and the like. In this case, as in the case of the positive electrode, it is possible to use a fluorine-containing resin such as PVDF as the negative electrode binding agent, and it is possible to use an organic solvent such as N-methyl-2-pyrrolidone as a solvent that causes these active materials and the binding agent to disperse.

c) Separator

A separator is arranged between the positive electrode and the negative electrode, and has the function of separating the positive electrode and negative electrode and holding the electrolyte. As this kind of separator, it is possible to use, for example, a thin film of polyethylene, polypropylene and the like, and that is a film having many fine pores, however, the separator is not particularly limited as long as the separator has the functions described above.

d) Non-Aqueous Electrolyte

The non-aqueous electrolyte is obtained by dissolving a lithium salt as a supporting salt in an organic solvent.

As the organic solvent, it is possible to use one kind or a mixture of two or more kinds selected from among a) a cyclic carbonate such as ethylene carbonate, propylene carbonate, butylene carbonate, trifluoropropylene carbonate and the like; b) a chain carbonate such as diethyl carbonate, dimethyl carbonate, ethyl methyl carbonate, dipropyl carbonate and the like; c) an ether compound such as tetrahydrofuran, 2-methyltetrahydrofuran, dimethoxyethane and the like; d) a sulfur compound such as ethyl methyl sulfone, butane sulton and the like; and e) a phosphorus compound such as triethyl phosphate, trioctyl phosphate and the like.

As the supporting salt, it is possible to use $LiPF_6$, $LiBF_4$, $LiClO_4$, $LiAsF_6$, $LiN(CF_3SO_2)_2$, a composite salt of these and the like.

The non-aqueous electrolyte may also include a radical scavenger, a surfactant, a flame retardant and the like.

(2) Non-Aqueous Electrolyte Secondary Battery

The non-aqueous electrolyte secondary battery of the present invention that includes the positive electrode, the negative electrode, the separator and the non-aqueous electrolyte described above can have various shapes such as a cylindrical shape, a laminated shape and the like.

No matter what shape is used, the positive electrode and the negative electrode are laminated via the separator to form an electrode body, and the obtained electrode body is impregnated with the non-aqueous electrolyte, and current collector leads are used to connect between the positive electrode current collector and a positive electrode terminal that extends to the outside, and between the negative electrode current collector and a negative electrode terminal that extends to the outside, and this is sealed in a battery case to complete the non-aqueous electrolyte secondary battery.

(3) Characteristics of the Non-Aqueous Electrolyte Secondary Battery

The non-aqueous electrolyte secondary battery of the present invention, as described above, uses the positive electrode active material of the present invention as the positive electrode material, so has excellent battery capacity, output characteristics and cycling characteristics. Moreover, even when compared with a conventional secondary battery that uses a positive electrode active material that includes a lithium transition metal-containing composite oxide, the non-aqueous electrolyte secondary battery of the present invention can be said to have excellent thermal stability and safety.

Figure 8:
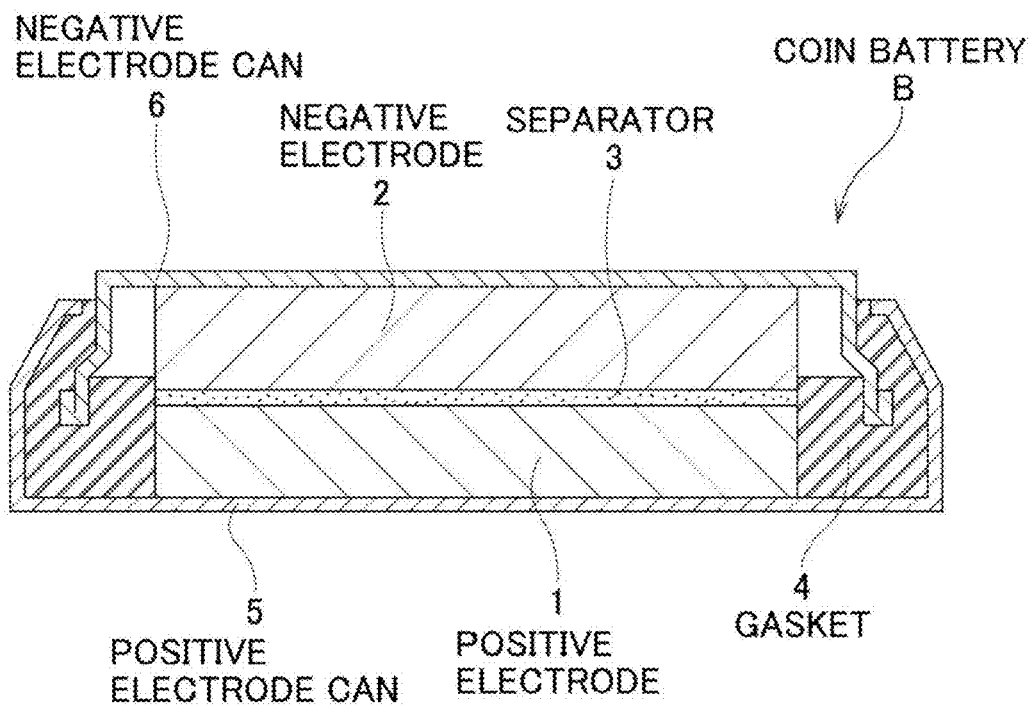
FIG. 8 is a schematic sectional view of a 2032 type coin battery that is used for battery evaluation.

For example, when configuring a 2032-type coin battery such as illustrated in FIG. 8 using the positive electrode active material of the present invention, it is possible to simultaneously achieve an initial discharge capacity of 150 mAh/g or more, and preferably 158 mAh/g or more, a positive electrode resistance of 1.10Ω or less and preferably 1.05Ω or less, and a 500-cycle capacity retention rate of 75% or more, and preferably 80% or more.

(4) Usage

The non-aqueous electrolyte secondary battery of the present invention, as described above, has excellent battery capacity, output characteristics and cycling characteristics, and can be suitably used in the power sources of compact portable electronic devices (laptop personal computers, portable telephones and the like) that require these characteristics at a high level. Moreover, the non-aqueous electrolyte secondary battery of the present invention is also excellent in terms of safety, and not only is it possible to make the secondary battery more compact and increase the output power, expensive protection circuits can be simplified, so the non-aqueous electrolyte secondary battery of the present invention can be suitable used as the power source for transport equipment that has limited installation space.

EXAMPLES

In the following, Examples and Comparative Examples will be used to explain the present invention in detail. In the Examples and Comparative Examples below, unless stated otherwise, special grade reagents manufactured by Wako Pure Chemical Industries, Ltd. were used. Moreover the pH value of the reaction aqueous solution through the nucleation process and particle-growth process was measured using a pH controller (NPH-690D, manufactured by Nissin Rika), and by adjusting the amount of sodium hydroxide aqueous solution supplied based on the measured value, the fluctuation range of the pH value of the reaction aqueous solution in each respective process was controlled to be within the range ±0.2.

Example 1 a) Producing Composite Hydroxide
[Nucleation Process]
First, 14 L of water was put into a 60 L reaction tank, and while stirring the temperature inside the tank was set to 40° C. When doing this, nitrogen gas was circulated in the reaction tank for 30 minutes, to make the reaction atmosphere a non-oxidizing atmosphere having an oxygen concentration of 2% by volume or less. Then, 25% by volume sodium hydroxide and 25% by volume ammonia water were supplied in proper amounts to the reaction tank, and by adjusting the pH value to be 12.8 at a reference liquid temperature of 25° C., and the ammonium ion concentration to be 10 g/L, a pre-reaction aqueous solution was formed.

At the same time, nickel sulfate, cobalt sulfate, manganese sulfate and zirconium sulfate were dissolved in water so that the molar ratios of the respective metal elements were Ni:Mn:Co:Zr=33.1:33.1:33.1:0.2, and a 2 mol/L raw material aqueous solution was made.

Next, by supplying this raw material aqueous solution to the pre-reaction aqueous solution at a rate of 100 ml/min, a nucleation aqueous solution was formed and nucleation was performed for 1 minute. When doing this, 25% by mass of sodium hydroxide aqueous solution and 25% by mass ammonia water were suitably supplied to maintain the pH value and ammonium ion concentration of the nucleation aqueous solution within the ranges described above.

[Particle-Growth Process]
After the nucleation ended, the supply of all aqueous solutions was stopped temporarily, and a particle-growth aqueous solution was formed by adding sulfate to adjust the pH value to 11.6 at a reference liquid temperature 25° C. After confirming that the pH value was at a specified value, the raw material aqueous solution and a sodium tungstate aqueous solution were supplied to cause the nuclei that were generated in the nucleation process to grow.

After the initial stage of the particle-growth process, or in other words, after 60 minutes had passed from the start of the particle-growth process (25% of the time with respect to the total time of the particle-growth process), a ceramic diffusing pipe (manufactured by Kinoshita Rika Kogyo Co., Ltd.) having mesh with a hole diameter in the range 20 μm to 30 μm was used to directly introduce air into the reaction aqueous solution while continuing as is the supply of raw material aqueous solution, and the reaction atmosphere was adjusted (switching operation 1) to an oxidizing atmosphere having an oxygen concentration of 21% by volume. By measuring the oxygen concentration in the reaction tank, it was confirmed that in switching operation 1, the switching time to an oxidizing atmosphere in which the oxygen concentration exceeds 5% by volume was 0.3% (approximately 0.7 minutes) with respect to the total time of the particle-growth process, and the switching time to an oxidizing atmosphere in which the oxygen concentration is 21% by volume was 2% (approximately 4.8 minutes) with respect to the total time of the particle-growth process.

After 10 minutes (4.2% with respect to the total time of the particle-growth process) had passed from switching operation 1, similarly nitrogen gas was directly introduced into the reaction aqueous solution while continuing as is the supply of raw material aqueous solution, and the reaction atmosphere was adjusted (switching operation 2) to a non-oxidizing atmosphere in which the oxygen concentration is 2% by volume or less. In switching operation 2, it was confirmed that the switching time for switching the atmosphere to a non-oxidizing atmosphere in which the oxygen concentration is 5% by volume or less was 1% with respect to the total time of the particle-growth process, and the switching time to a non-oxidizing atmosphere in which the oxygen concentration is 2% by volume or less was 2% with respect to the total time of the particle-growth process.

After 170 minutes (70.8% with respect to the total time of the particle-growth process) had passed, the particle-growth process was ended by stopping the supply of all aqueous solutions. When doing this, the concentration of product in the particle-growth aqueous solution was 86 g/L. After that, the obtained product was washed, filtered and dried to obtain a composite hydroxide powder.

In the particle-growth process, 25% by mass of sodium hydroxide aqueous solution and 25% by mass ammonia water were suitably supplied through this process to maintain the pH value and ammonium ion concentration of the particle-growth aqueous solution within the ranges described above.

b) Evaluation of the Composite Hydroxide
[Composition]
By performing analysis using an ICP emission spectrophotometer (ICPE-9000 manufactured by Shimadzu Corporation), it was confirmed that the composite hydroxide is expressed by the general formula: $Ni_{0.331}Mn_{0.331}Co_{0.331}Zr_{0.002}W_{0.005}(OH)_2$.

[Particle Structure]
Part of the composite hydroxide was embedded in resin, and by performing a cross-section polishing process, the cross-section was put into an observable state and the cross section was observed using an SEM (JSM-6360LA, manufactured by JEOL Ltd.) (refer to FIG. 1). As a result, it was confirmed that the secondary particles of this composite hydroxide have a center section that is formed by an aggregate of plate-shaped primary particles, and includes one layered structure around the outside of the center section in which a low-density layer that is formed by an aggregate of plate-shaped primary particles and fine primary particles, and a high-density layer that is formed by an aggregate of plate-shaped primary particles are layered; and the high-density layer is linked with the center section by a high-density section that is formed by an aggregate of plate-shaped primary particles inside the low-density layer. In this Example, the pH value in the nucleation process was 12.8, so the center section of secondary particles of composite hydroxide had a low-density section inside that includes fine particles. Moreover, it was confirmed that the average particle size of the fine primary particles was 0.2 μm, and the average particle size of the plate-shaped primary particles was 0.5 μm. Furthermore, it was confirmed that the center section particle size ratio was 62%, and the high-density layer particle size ratio was 13%.

[Average Particle Size and Particle Size Distribution]

A laser diffraction scattering type particle size analyzer (Microtrac HRA, manufactured by Nikkiso Co., Ltd.) was used, and together with measuring the average particle size of secondary particles of composite hydroxide, d10 and d90 were measured and the index [(d90-d10)/average particle size] that indicates the spread of the particle size distribution was calculated. As a result, it was confirmed that the average particle size of secondary particles was 5.1 μm, and the index [(d90-d10)/average particle size] was 0.42.

c) Producing Positive Electrode Active Material

The composite hydroxide that was obtained as described above was heated treated for 12 hours in a flow of air (oxygen concentration: 21% by volume), at 120° C. (heat-treatment process), after which lithium carbonate was sufficiently mixed in using a shaker mixer (TURBULA Type T2C, manufactured by Willy A. Bachofen AG (WAB)) so that the ratio Li/Me became 1.14, and a lithium mixture was obtained (mixing process).

This lithium mixture was then calcined in a flow of air (oxygen concentration: 21% by volume) by increasing the temperature to 950° C. at a rate of temperature increase of 2.5° C./min., and maintaining the lithium mixture at this temperature for 4 hours, after which the lithium mixture was cooled to room temperature at a cooling rage of approximately 4° C./min. (calcination process). In the positive electrode active material that was obtained in this way, aggregation or light sintering occurred among the particles. Therefore, this positive electrode active material was crushed, and the average particle size and particle size distribution were adjusted (crushing process).

d) Evaluation of the Positive Electrode Active Material

[Composition]

By performing analysis using an ICP emission spectrophotometer, it was confirmed that this positive electrode active material is expressed by the general formula: $Li_{1.14}Ni_{0.331}Mn_{0.331}Co_{0.331}Zr_{0.002}W_{0.005}O_2$.

[Particle Structure]

Figure 2:
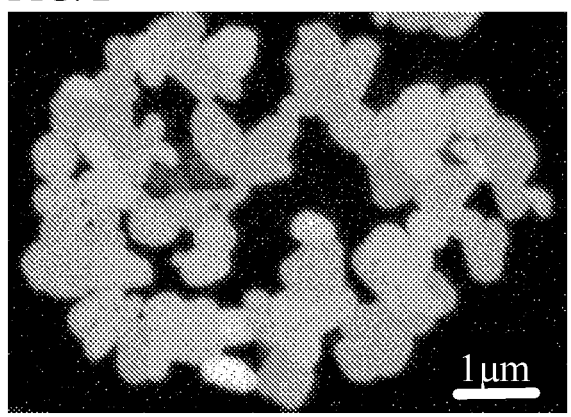
FIG. 2 is a FE-SEM photograph (5000× observation magnification rate) illustrating a cross section of secondary particles of positive electrode active material that is obtained in Example 1.

Part of the positive electrode active material is embedded in resin, and by performing a cross-section polishing process the cross-section was put in an observable state, and observed by a SEM (refer to FIG. 2). As a result, this positive electrode active material was confirmed to include secondary particles that are formed by an aggregate of plural primary particles, and the secondary particles were confirmed to include: an outer-shell section; aggregate sections of plural primary particles that are dispersed and exist inside the outer-shell section and are structurally connected by connecting sections to the outer-shell section and to other aggregate sections of primary particles, and are electrically connected to the outer-shell section; and space sections in which primary particles do not exist. Moreover, it was confirmed that the outer-shell section particle size ratio was 16%, and the space section ratio was 35%.

[Average Particle Size and Particle Size Distribution]

A laser diffraction scattering type particle size analyzer (Microtrac HRA, manufactured by Nikkiso Co., Ltd.) was used, and together with measuring the average particle size of the positive electrode active material, d10 and d90 were measured and the index [(d90-d10)/average particle size] that indicates the spread of the particle size distribution was calculated. As a result, it was confirmed that the average particle size was 4.6 μm, and the index [(d90-d10)/average particle size] was 0.41.

[Specific Surface Area, Tap Density and Surface Area Per Unit Volume]

Using a flow-type gas adsorption method specific surface area measuring apparatus (Multisorb, manufactured by Yuasa Ionics Co., Ltd.), the specific surface area was measured, and using a tapping machine (KRS-406, manufactured by Kuramochi Kagaku Kikai Co., Ltd.), the tap density was measured. As a result, it was confirmed that the BET specific surface area was 1.92 $m^2/g$, and the tap density was 1.42 $g/cm^3$. From these results, the surface area per unit volume was found to be 2.73 $m^2/cm^3$.

e) Producing a Secondary Battery

A positive electrode (1) was made by mixing 52.5 mg of the positive active material that was obtained as described above, 15 mg of acetylene black, and 7.5 mg of PTEE, applying 100 MPa pressure to form the material into a pressed shape having an 11 mm diameter and 100 μm thickness, then drying the mixture at 120° C. for 12 hours.

Next, a 2032-type coin battery (B) was made using this positive electrode (1) inside a glove box having an Ar atmosphere that is managed to have a dew point at −80° C. For the negative electrode (2) of this 2032-type coin battery, lithium metal having a 17 mm diameter and 1 mm thickness was used, and for the electrolyte, a solution having an equal mixture of ethylene carbonate (EC) and diethyl carbonate (DEC) with 1M of $LiClO_4$ as a supporting electrolyte (manufactured by Toyama Chemical Industry Co., Ltd.) was used. Moreover, for the separator (3), a porous polyethylene film having a 25 μm film thickness was used. The 2032-type coin battery (B) has a gasket (4), and was assembled into a coin-shaped battery with a positive electrode can (5) and negative electrode can (6).

f) Battery Evaluation

[Initial Discharge Capacity]

After making the 2032-type coin battery, the battery was left for about 24 hours, and after the open circuit voltage OCV became stable, the initial discharge capacity was found by performing a charge/discharge test by charging the battery with a current density with respect to the positive electrode of 0.1 $mA/cm^2$ until the cut-off voltage became 4.3 V, then after charging was stopped for 1 hour, discharging the battery until the cut-off voltage became 3.0 V, and measuring the discharge capacity at that point. As a result, it was confirmed that the initial discharge capacity was 159.6 mAh/g. When measuring the initial discharge capacity, a multichannel voltage/current generator (R6741A, manufactured by Advantest Corporation) was used.

[Positive Electrode Resistance]

Figure 9:
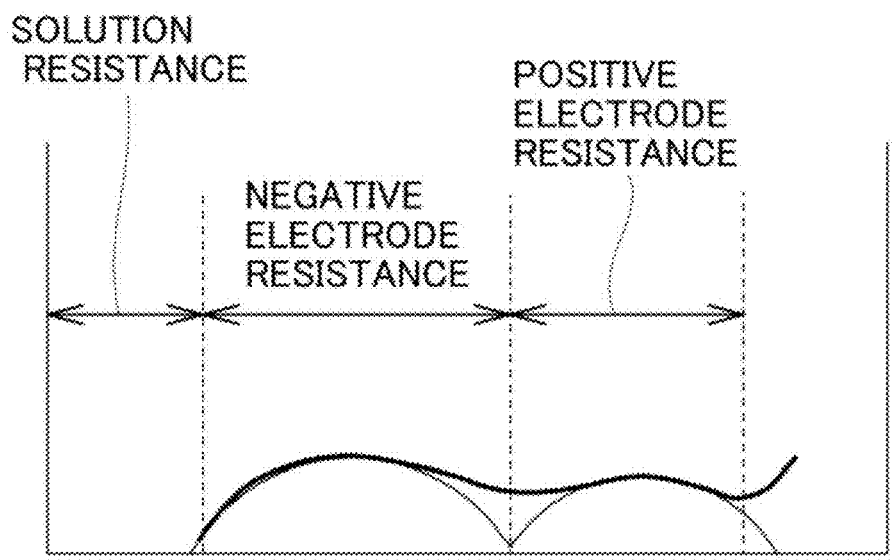
FIG. 9 illustrates a measurement example used in impedance evaluation, and a schematic explanatory diagram of an equivalent circuit that is used for analysis.
Figure 9:
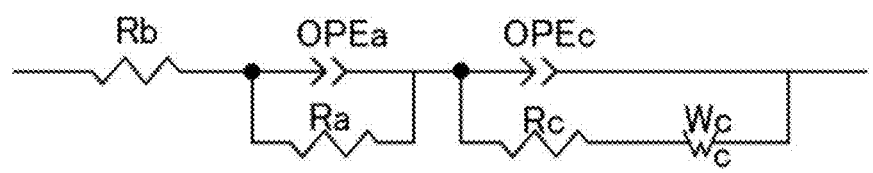

Using a 2032-type coin battery that was charged to a charge potential of 4.1V, the value of the resistance was measured by an alternating-current impedance method. For this measurement, a frequency response analyzer and a Potentio Galvanostat (manufactured by Solotran Analytical) were used, and the Nyquist plot illustrated in FIG. 9 was obtained. The plot expresses the sum of characteristic curves that indicate the solution resistance, negative electrode resistance and capacity, and the positive electrode resistance and capacity, so the value of the positive electrode resistance was calculated by performing a fitting calculation using an equivalent circuit. As a result, it was confirmed that the positive electrode resistance was 0.932Ω.

[Cycling Characteristics]

The 500-cycle capacity retention rate was calculated by repeating the charge/discharge test described above and measuring the discharge capacity 500 times. As a result, it was confirmed that the 500-cycle capacity retention rate was 82.0%.

Example 2

Except for performing switching operation 1 in the particle-growth process after 60 minutes had passed from the start of the particle-growth process (25% with respect to the total time of the particle-growth process), and performing switching operation 2 after 5 minutes had passed from switching operation 1 (2.1% with respect to the total time of the particle growth process), and then after that, continuing the crystallization process for 175 minutes (72.9% with respect to the total time of the particle-growth process), composite hydroxide, positive electrode active material and a secondary battery were obtained and evaluated in the same way as in Example 1. The results are given in Table 2 to Table 4.

Example 3

Except for performing switching operation 1 in the particle-growth process after 60 minutes had passed from the start of the particle-growth process (25% with respect to the total time of the particle-growth process), and performing switching operation 2 after 15 minutes had passed from switching operation 1 (6.3% with respect to the total time of the particle growth process), and then after that, continuing the crystallization process for 165 minutes (68.8% with respect to the total time of the particle-growth process), composite hydroxide, positive electrode active material and a secondary battery were obtained and evaluated in the same way as in Example 1. The results are given in Table 2 to Table 4.

Example 4

First, 14 L of water was put into a 60 L reaction tank while stirring, and the temperature inside the tank was set to 40° C. When doing this, nitrogen gas was circulated inside the reaction tank for 5 minutes to make the reaction atmosphere an oxidizing atmosphere having an oxygen concentration of 13% by volume. Continuing, a pre-reaction aqueous solution was formed by suitably supplying 25% by mass of sodium hydroxide aqueous solution and 25% by mass of ammonia water into the reaction tank to adjust the solution until the pH value became 12.8 at a reference liquid temperature of 25° C., and the ammonium ion concentration became 10 g/L.

At the same time, 2 mol/L of raw material aqueous solution was prepared by dissolving nickel sulfate, cobalt sulfate, manganese sulfate and zirconium sulfate in water so that the molar ratios of the metal elements became Ni:Mn:Co:Zr=33.1:33.1:33.1:0.2.

Next, nitrogen gas was introduce into the pre-reaction aqueous solution using a diffusing pipe in the same way as in Example 1, and while adjusting the reaction atmosphere to be a non-oxidizing atmosphere having an oxygen concentration of 2% by volume or less, a nucleation aqueous solution was formed by supplying the raw material aqueous solution to the pre-reaction aqueous solution at a rate of 100 ml/min., and nucleation was performed for 1 minute. When doing this, 25% by mass of sodium hydroxide aqueous solution and 25% by mass ammonia water were suitably supplied to maintain the pH value and ammonium ion concentration of the nucleation aqueous solution within the ranges described above. Moreover, at the end of the nucleation process, it was confirmed that the reaction atmosphere was adjusted to a non-oxidizing atmosphere having a reaction atmosphere of 2% by volume or less.

After that, the particle-growth process was performed under the same conditions as in Example 1, and a composite hydroxide was obtained and evaluated. Moreover, except for using this composite hydroxide as a precursor, positive electrode active material and a secondary battery were obtained and evaluated in the same way as in Example 1. The results are given in Table 2 to Table 4.

The positive electrode active material of Example 4 included a particle structure in which further spaces were formed inside the aggregate sections of primary particles.

Example 5

Except for performing switching operation 1 in the particle-growth process after 48 minutes had passed from the start of the particle-growth process (20% with respect to the total time of the particle-growth process), and performing switching operation 2 after 5 minutes had passed from switching operation 1 (2.1% with respect to the total time of the particle growth process), and then after that, continuing the crystallization process for 187 minutes (77.9% with respect to the total time of the particle-growth process), composite hydroxide, positive electrode active material and a secondary battery were obtained and evaluated in the same way as in Example 1. The results are given in Table 2 to Table 4.

Example 6

Except for performing switching operation 1 in the particle-growth process after 48 minutes had passed from the start of the particle-growth process (20% with respect to the total time of the particle-growth process), and performing switching operation 2 after 10 minutes had passed from switching operation 1 (4.2% with respect to the total time of the particle growth process), and then after that, continuing the crystallization process for 182 minutes (75.8% with respect to the total time of the particle-growth process), composite hydroxide, positive electrode active material and a secondary battery were obtained and evaluated in the same way as in Example 1. The results are given in Table 2 to Table 4.

Example 7

Except for performing switching operation 1 in the particle-growth process after 1.2 minutes had passed from the start of the particle-growth process (0.5% with respect to the total time of the particle-growth process), and performing switching operation 2 after 10 minutes had passed from switching operation 1 (4.2% with respect to the total time of the particle growth process), and then after that, continuing the crystallization process for 228 minutes (95.3% with respect to the total time of the particle-growth process), composite hydroxide, positive electrode active material and a secondary battery were obtained and evaluated in the same way as in Example 1. The results are given in Table 2 to Table 4.

Example 8

Except for performing switching operation 1 in the particle-growth process after 72 minutes had passed from the start of the particle-growth process (30% with respect to the total time of the particle-growth process), and performing switching operation 2 after 10 minutes had passed from switching operation 1 (4.2% with respect to the total time of the particle growth process), and then after that, continuing the crystallization process for 158 minutes (65.8% with respect to the total time of the particle-growth process), composite hydroxide, positive electrode active material and a secondary battery were obtained and evaluated in the same way as in Example 1. The results are given in Table 2 to Table 4.

Example 9

Except for performing switching operation 1 in the particle-growth process after 60 minutes had passed from the start of the particle-growth process (25% with respect to the total time of the particle-growth process), and performing switching operation 2 after 3 minutes had passed from switching operation 1 (1.25% with respect to the total time of the particle growth process), and then after that, continuing the crystallization process for 177 minutes (73.8% with respect to the total time of the particle-growth process), composite hydroxide, positive electrode active material and a secondary battery were obtained and evaluated in the same way as in Example 1. The results are given in Table 2 to Table 4.

Example 10

Except for performing switching operation 1 in the particle-growth process after 60 minutes had passed from the start of the particle-growth process (25% with respect to the total time of the particle-growth process), and performing switching operation 2 after 50 minutes had passed from switching operation 1 (20.8% with respect to the total time of the particle growth process), and then after that, continuing the crystallization process for 130 minutes (54.2% with respect to the total time of the particle-growth process), composite hydroxide, positive electrode active material and a secondary battery were obtained and evaluated in the same way as in Example 1. The results are given in Table 2 to Table 4.

Example 11

Figure 3:
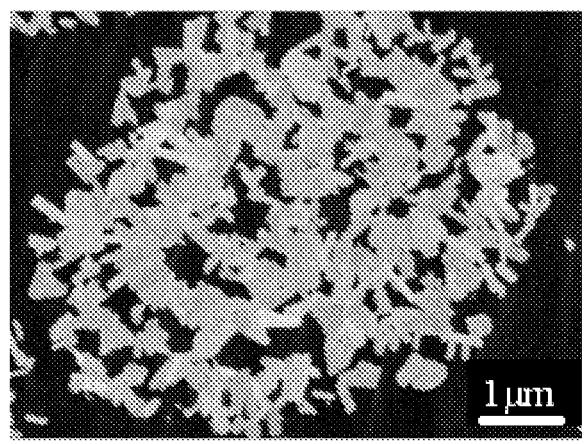
FIG. 3 is a FE-SEM photograph (5000× observation magnification rate) illustrating a cross section of secondary particles of positive electrode active material that is obtained in Example 11.
Figure 4:
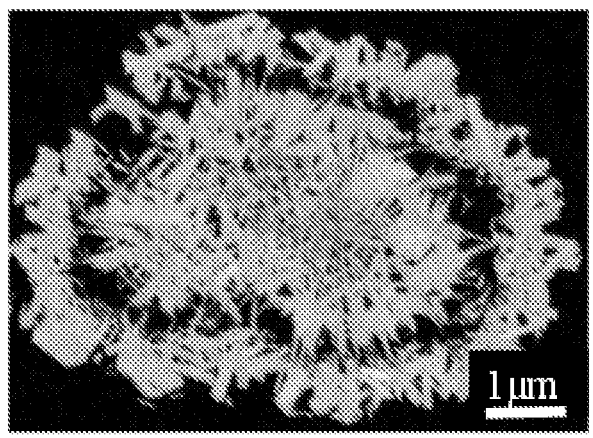
FIG. 4 is a FE-SEM photograph (5000× observation magnification rate) illustrating a cross section of secondary particles of a transition metal-containing composite hydroxide that is obtained in Comparative Example 1.

Except for performing switching operation 1 and switching operation 2 two times each at specified timing in the particle-growth process, composite hydroxide was obtained in the same way as in Example 1. More specifically, switching operation 1 was performed after 30 minutes (12.5% with respect to the total time of the particle-growth process) had passed from the start of the particle-growth process, then switching process 2 was performed after the crystallization reaction was continued in an oxidizing atmosphere for 15 minutes (6.3% with respect to the total time of the particle-growth process), and then the crystallization reaction was continued in a non-oxidizing atmosphere for 40 minutes (16.7% with respect to the total time of the particle-growth process). Continuing, switching operation 1 was performed, then after the crystallization reaction was continued in an oxidizing atmosphere for 15 minutes (6.3% with respect to the total time of the particle-growth process), switching operation 2 was performed, and the crystallization process was continued in a non-oxidizing atmosphere for 140 minutes (58.3% with respect to the total time of particle-growth process). The composite hydroxide that was obtained in this way was evaluated in the same way as in Example 1. The results are given in Table 2. Moreover, except for using this composite hydroxide as a precursor, positive electrode activated material and a secondary battery were obtained and evaluated in the same way as in Example 1. The results are given in Table 2 to Table 4 and FIG. 3.

Comparative Example 1

Figure 5:
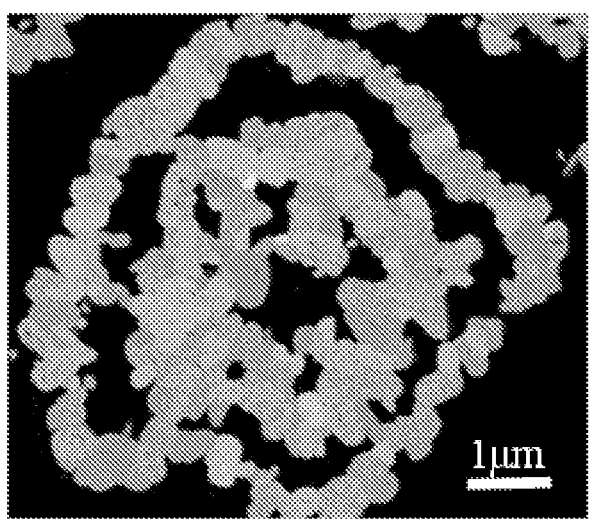
FIG. 5 is a FE-SEM photograph (5000× observation magnification rate) illustrating a cross section of secondary particles of positive electrode active material that is obtained in Comparative Example 1.

When performing switching operations 1 and 2 for switching the reaction atmosphere in the particle-growth process, except for temporarily stopping the supply of raw material aqueous solution, the composite hydroxide was obtained and evaluated in the same way as in Example 1. The results are given in Table 2 to Table 4. Moreover, except for using this composite hydroxide as a precursor, positive electrode active material and a secondary battery were obtained and evaluated in the same way as in Example 1. The results are given in Table 3, Table 4 and FIG. 5.

Comparative Example 2

First, 14 L of water was put into a 60 L reaction tank while stirring and the temperature of the reaction tank was set to 40° C. When doing this, nitrogen gas was circulated in the reaction tank for 5 minutes to make the reaction atmosphere an oxidizing atmosphere having an oxygen concentration of 13% by volume. Next, a pre-reaction aqueous solution was formed by suitably supplying 25% by mass of sodium hydroxide aqueous solution and 25% by mass ammonia water into the reaction tank and adjusting the pH value to be 12.8 at a reference liquid temperature of 25° C., and the ammonium ion concentration to be 10 g/L.

At the same time, 2 mol/L of raw material aqueous solution was prepared by dissolving nickel sulfate, cobalt sulfate, manganese sulfate and zirconium sulfate in water so that the mole ratios of the metal elements became Ni:Mn:Co:Zr=33.1:33.1:33.1:0.2.

Next, the state of the oxidizing atmosphere was maintained, and a nucleation aqueous solution was formed by supplying the raw material aqueous solution to the pre-reaction aqueous solution at a rate of 100 ml/min., and nucleation was performed for 1 minute. When doing this, 25% by mass of sodium hydroxide aqueous solution and 25% by mass of ammonia water were suitably supplied to maintain the pH value and ammonium concentration of the nucleation aqueous solution within the ranges described above.

Figure 6:
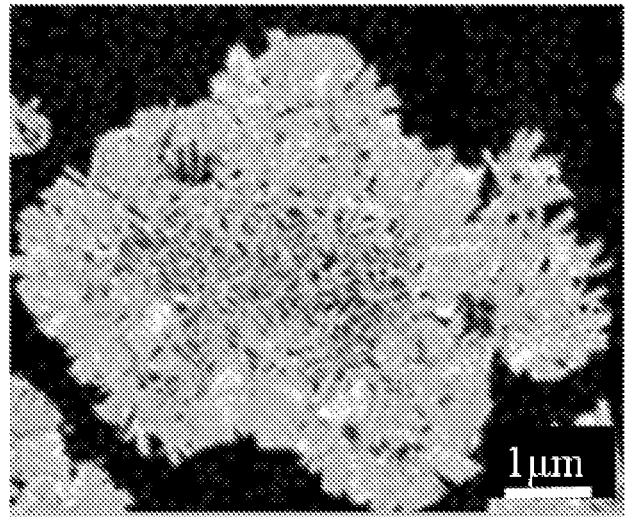
FIG. 6 is a FE-SEM photograph (5000× observation magnification rate) illustrating a cross section of secondary particles of a transition metal-containing composite hydroxide that is obtained in Comparative Example 2.
Figure 7:
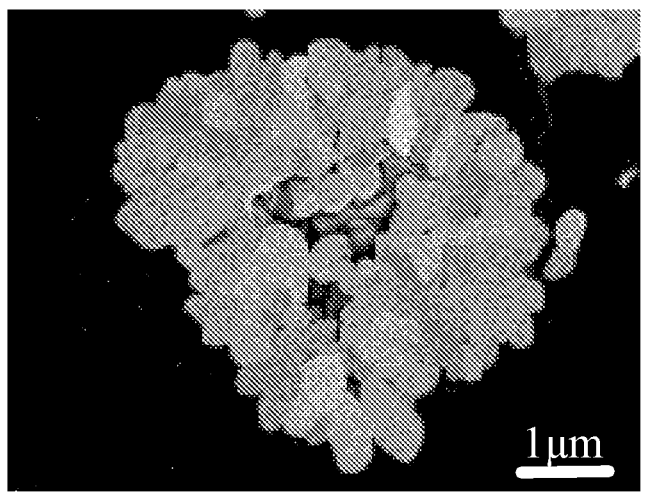
FIG. 7 is a FE-SEM photograph (5000× observation magnification rate) illustrating a cross section of secondary particles of positive electrode active material that is obtained in Comparative Example 2.

After that, in the particle-growth process, after 60 minutes (25% with respect to the total time of the particle-growth process) had passed from the start of the particle-growth process, the supply of the raw material aqueous solution was temporarily stopped, and the reaction atmosphere was adjusted to a non-oxidizing atmosphere having an oxygen concentration of 2% by volume or less. After adjustment of the atmosphere, the supply of the raw material aqueous solution was restarted, and the crystallization reaction was continued for 180 minutes (75% with respect to the total time of the particle-growth process). Except for adjustment of the atmosphere, composite hydroxide was obtained and evaluated under the same conditions as in Example 1. The results are given in Table 2 and FIG. 6. The particle structure of the secondary particles of the obtained composite hydroxide had a center section of fine primary particles, and a high-density layer of plate-shaped primary particles on the outside of the center section. Moreover, except for using this composite hydroxide as a precursor, positive electrode active material and a secondary battery were obtained and evaluated in the same way as in Example 1. The results are given in Table 3, Table 4 and FIG. 7.

Comparative Example 3

Sodium hydroxide, cobalt hydroxide, Trimanganese tetraoxide, Zirconium sulfate, tungsten oxide, lithium carbonate were mixed so that the molar ratios of the metal elements became Ni:Mn:Co:Zr:W=33.1:33.133.1:0.2:0.005 and so that the ratio Li/Me became 1.14, after which this mixture was added to pure water to make a slurry. Continuing, a ball mill was used to perform wet crushing so that the average particle size of the solid content in the slurry became 0.2 μm. The slurry was then spray dried using a spray drier to obtain a composite hydroxide, and composite hydroxide was evaluated in the same way as in Example 1. The results are given in Table 2. Moreover, except for using this composite hydroxide as a precursor, positive electrode active material and a secondary battery were obtained and evaluated in the same was as in Example 1. The results are given in Table 3 and Table 4.

The positive electrode active material that is obtained in Comparative Example 3 included secondary particles having aggregate structure formed by an aggregate of plural primary particles, and in this particle structure, an outer-shell section was not confirmed. Moreover, the secondary particles are formed by the aggregate sections of primary particles simply coming in contact with each other, connecting sections as in Example 1 were not confirmed.

TABLE 1

| | Nucleation Process | Start to Switching Operation 1 | | Switching Operation 1 to 2 | | Switching Operation 2 to 1 | | Switching Operation 1 to 2 | | | Supply of Raw Material |
|---|---|---|---|---|---|---|---|---|---|---|---|
| | $O_2$ Concentration (% by volume) | Switching time (%) | $O_2$ concentration (% by volume) | Switching time (%) | $O_2$ concentration (% by volume) | Switching time (%) | $O_2$ concentration (% by volume) | Switching time (%) | $O_2$ concentration (% by volume) | Method of Switching Operation 1 | Aqueous Solution at Switching |
| Ex 1 | 2 or less | 25 | 21 | 4.2 | 2 or less | — | — | — | — | DP | Continued |
| Ex 2 | 2 or less | 25 | 21 | 2.1 | 2 or less | — | — | — | — | DP | Continued |
| Ex 3 | 2 or less | 25 | 21 | 6.3 | 2 or less | — | — | — | — | DP | Continued |
| Ex 4 | 13 to 2 or less | 25 | 21 | 8.3 | 2 or less | — | — | — | — | DP | Continued |
| Ex 5 | 2 or less | 20 | 21 | 2.1 | 2 or less | — | — | — | — | DP | Continued |
| Ex 6 | 2 or less | 20 | 21 | 4.3 | 2 or less | — | — | — | — | DP | Continued |
| Ex 7 | 2 or less | 0.5 | 21 | 4.2 | 2 or less | — | — | — | — | DP | Continued |
| Ex 8 | 2 or less | 30 | 21 | 4.2 | 2 or less | — | — | — | — | DP | Continued |
| Ex 9 | 2 or less | 25 | 21 | 1.25 | 2 or less | — | — | — | — | DP | Continued |
| Ex 10 | 2 or less | 25 | 21 | 20.8 | 2 or less | — | — | — | — | DP | Continued |
| Ex 11 | 2 or less | 12.5 | 21 | 6.3 | 2 or less | 16.7 | 21 | 6.3 | 2 or less | DP | Continued |
| CE 1 | 2 or less | 25 | 21 | 4.2 | 2 or less | — | — | — | — | DP | Stopped |
| CE 2 | 13 | — | — | 25 | 2 or less | — | — | — | — | Pipe | Continued |
| CE 3 | — | — | — | — | — | — | — | — | — | — | — |

Ex: Example
CE: Comparative Example
DP: Diffusion Pipe

TABLE 2

| | General Formula | Particle Structure | Fine Primary Particles (μm) | Plate-shaped Primary Particles (μm) | Center Section Particle Size Ratio (%) | High-Density Layer Particle Size Ratio (%) | High-Density Layer 1-Layer Particle Size Ratio (%) | Average Particle Size (μm) | (d90 − d10)/ Average Particle Size |
|---|---|---|---|---|---|---|---|---|---|
| Ex 1 | $Ni_{0.331}Mn_{0.331}Co_{0.331}Zr_{0.002}W_{0.005}(OH)_2$ | Layered structure/linked | 0.2 | 0.5 | 62 | 13 | 13 | 5.1 | 0.42 |
| Ex 2 | $Ni_{0.331}Mn_{0.331}Co_{0.331}Zr_{0.002}W_{0.005}(OH)_2$ | Layered structure/linked | 0.2 | 0.6 | 54 | 15 | 15 | 4.9 | 0.42 |
| Ex 3 | $Ni_{0.331}Mn_{0.331}Co_{0.331}Zr_{0.002}W_{0.005}(OH)_2$ | Layered structure/linked | 0.3 | 0.6 | 54 | 14 | 14 | 4.9 | 0.41 |
| Ex 4 | $Ni_{0.331}Mn_{0.331}Co_{0.331}Zr_{0.002}W_{0.005}(OH)_2$ | Layered structure/linked | 0.2 | 0.5 | 68 | 8 | 8 | 5.6 | 0.46 |
| Ex 5 | $Ni_{0.331}Mn_{0.331}Co_{0.331}Zr_{0.002}W_{0.005}(OH)_2$ | Layered structure/linked | 0.2 | 0.5 | 58 | 12 | 12 | 4.6 | 0.42 |
| Ex 6 | $Ni_{0.331}Mn_{0.331}Co_{0.331}Zr_{0.002}W_{0.005}(OH)_2$ | Layered structure/linked | 0.2 | 0.6 | 65 | 15 | 15 | 4.8 | 0.41 |
| Ex 7 | $Ni_{0.331}Mn_{0.331}Co_{0.331}Zr_{0.002}W_{0.005}(OH)_2$ | Layered structure/linked | 0.2 | 0.5 | 35 | 16 | 10 | 5.2 | 0.42 |
| Ex 8 | $Ni_{0.331}Mn_{0.331}Co_{0.331}Zr_{0.002}W_{0.005}(OH)_2$ | Layered structure/linked | 0.2 | 0.7 | 72 | 13 | 13 | 5.1 | 0.46 |

TABLE 2-continued

| | General Formula | Particle Structure | Fine Primary Particles (μm) | Plate-shaped Primary Particles (μm) | Center Section Particle Size Ratio (%) | High-Density Layer Particle Size Ratio (%) | High-Density Layer 1-Layer Particle Size Ratio (%) | Average Particle Size (μm) | (d90 − d10)/ Average Particle Size |
|---|---|---|---|---|---|---|---|---|---|
| Ex 9 | $Ni_{0.331}Mn_{0.331}Co_{0.331}Zr_{0.002}W_{0.005}(OH)_2$ | Layered structure/linked | 0.2 | 0.5 | 65 | 11 | 11 | 5.8 | 0.40 |
| Ex 10 | $Ni_{0.331}Mn_{0.331}Co_{0.331}Zr_{0.002}W_{0.005}(OH)_2$ | Layered structure/linked | 0.3 | 0.5 | 68 | 8 | 12 | 5.2 | 0.41 |
| Ex 11 | $Ni_{0.331}Mn_{0.331}Co_{0.331}Zr_{0.002}W_{0.005}(OH)_2$ | Layered structure/linked | 0.2 | 0.4 | 41 | 25 | 12 | 4.9 | 0.43 |
| CE 1 | $Ni_{0.331}Mn_{0.331}Co_{0.331}Zr_{0.002}W_{0.005}(OH)_2$ | Layered structure | 0.3 | 0.5 | 64 | 12 | 12 | 4.6 | 0.41 |
| CE 2 | $Ni_{0.331}Mn_{0.331}Co_{0.331}Zr_{0.002}W_{0.005}(OH)_2$ | Fine/plate shaped | 0.4 | 0.6 | — | — | — | 4.9 | 0.41 |
| CE 3 | $Ni_{0.331}Mn_{0.331}Co_{0.331}Zr_{0.002}W_{0.005}(OH)_2$ | Aggregate structure | — | — | — | — | — | — | — |

Ex: Example
CE: Comparative Example

TABLE 3

| | General Formula | Particle Structure (*) | Outer-shell Section Particle Size Ratio (%) | Space Section Ratio (%) | Average Particle Size (μm) | (d90 − d10)/ Average Particle Size | Surface Area Per Unit Volume (m²/cm³) | Specific Surface Area (m²/g) | Tap Density (g/cm³) |
|---|---|---|---|---|---|---|---|---|---|
| Ex 1 | $Li_{1.14}Ni_{0.331}Mn_{0.331}Co_{0.331}Zr_{0.002}W_{0.002}W_{0.005}O_2$ | A | 16 | 35 | 4.6 | 0.41 | 2.73 | 1.92 | 1.42 |
| Ex 2 | $Li_{1.14}Ni_{0.331}Mn_{0.331}Co_{0.331}Zr_{0.002}W_{0.002}W_{0.005}O_2$ | A | 17 | 38 | 4.4 | 0.41 | 2.40 | 1.53 | 1.56 |
| Ex 3 | $Li_{1.14}Ni_{0.331}Mn_{0.331}Co_{0.331}Zr_{0.002}W_{0.002}W_{0.005}O_2$ | A | 16 | 42 | 4.4 | 0.40 | 2.38 | 1.64 | 1.45 |
| Ex 4 | $Li_{1.14}Ni_{0.331}Mn_{0.331}Co_{0.331}Zr_{0.002}W_{0.002}W_{0.005}O_2$ | A | 10 | 58 | 5.1 | 0.41 | 2.03 | 1.42 | 1.43 |
| Ex 5 | $Li_{1.14}Ni_{0.331}Mn_{0.331}Co_{0.331}Zr_{0.002}W_{0.002}W_{0.005}O_2$ | A | 14 | 28 | 4.1 | 0.40 | 3.53 | 1.96 | 1.83 |
| Ex 6 | $Li_{1.14}Ni_{0.331}Mn_{0.331}Co_{0.331}Zr_{0.002}W_{0.002}W_{0.005}O_2$ | A | 18 | 36 | 4.5 | 0.42 | 4.33 | 2.52 | 1.72 |
| Ex 7 | $Li_{1.14}Ni_{0.331}Mn_{0.331}Co_{0.331}Zr_{0.002}W_{0.002}W_{0.005}O_2$ | A | 18 | 30 | 4.8 | 0.43 | 2.93 | 1.81 | 1.62 |
| Ex 8 | $Li_{1.14}Ni_{0.331}Mn_{0.331}Co_{0.331}Zr_{0.002}W_{0.002}W_{0.005}O_2$ | A | 14 | 26 | 4.9 | 0.41 | 2.70 | 1.58 | 1.71 |
| Ex 9 | $Li_{1.14}Ni_{0.331}Mn_{0.331}Co_{0.331}Zr_{0.002}W_{0.002}W_{0.005}O_2$ | A | 12 | 46 | 5.2 | 0.41 | 3.00 | 1.66 | 1.81 |
| Ex 10 | $Li_{1.14}Ni_{0.331}Mn_{0.331}Co_{0.331}Zr_{0.002}W_{0.002}W_{0.005}O_2$ | A | 9 | 48 | 4.4 | 0.42 | 3.86 | 2.33 | 1.68 |
| Ex 11 | $Li_{1.14}Ni_{0.331}Mn_{0.331}Co_{0.331}Zr_{0.002}W_{0.002}W_{0.005}O_2$ | A | 14 | 54 | 4.4 | 0.43 | 4.84 | 3.51 | 1.38 |
| CE 1 | $Li_{1.14}Ni_{0.331}Mn_{0.331}Co_{0.331}Zr_{0.002}W_{0.002}W_{0.005}O_2$ | B | 13 | 42 | 4.7 | 0.39 | 1.64 | 1.38 | 1.19 |
| CE 2 | $Li_{1.14}Ni_{0.331}Mn_{0.331}Co_{0.331}Zr_{0.002}W_{0.002}W_{0.005}O_2$ | C | 35 | 71 | 5.1 | 0.41 | 1.60 | 0.82 | 1.95 |
| CE 3 | $Li_{1.14}Ni_{0.331}Mn_{0.331}Co_{0.331}Zr_{0.002}W_{0.002}W_{0.005}O_2$ | D | — | 68 | 4.6 | 0.67 | 1.64 | 2.02 | 0.81 |

(*) Particle Structure
A: Structure in which aggregate sections and spaces are dispersed inside the outer-shell section.
B: Structure in which spaces and outer-shell section are layered outside the center section.
C: Hollow structure
D: Aggregate structure

TABLE 4

| | Initial Discharge Capacity (mAh/g) | Initial Discharge Capacity (mAh/g) | Capacity Retention Rate (%) |
|---|---|---|---|
| Ex 1 | 159.6 | 0.932 | 82.0 |
| Ex 2 | 158.8 | 1.014 | 81.5 |
| Ex 3 | 158.5 | 1.032 | 82.1 |
| Ex 4 | 158.0 | 1.063 | 81.3 |
| Ex 5 | 158.1 | 0.985 | 80.6 |
| Ex 6 | 157.7 | 0.904 | 80.2 |
| Ex 7 | 158.0 | 1.044 | 80.4 |
| Ex 8 | 157.9 | 1.087 | 80.6 |
| Ex 9 | 158.5 | 1.026 | 80.7 |
| Ex 10 | 158.6 | 0.961 | 81.0 |
| Ex 11 | 158.4 | 0.892 | 80.7 |
| CE 1 | 158.8 | 1.118 | 80.7 |
| CE 2 | 157.6 | 1.370 | 77.9 |
| CE 3 | 157.1 | 1.492 | 76.8 |

EXPLANATION OF REFERENCE NUMBERS

1 Positive Electrode (Evaluation Electrode)
2 Negative Electrode
3 Separator
4 Gasket
5 Positive Electrode Can
6 Negative Electrode Can
B 2032-type Coin Battery

What is claimed is:

1. A transition metal-containing composite oxide that is a precursor to a positive electrode active material for a non-aqueous electrolyte secondary battery, comprising:
secondary particles formed by aggregates of plate-shaped primary particles and fine primary particles that are smaller than the plate-shaped primary particles;
the secondary particles having a center section formed by aggregates of the plate-shaped primary particles, and at least one layered structure formed on an outside of the center section, the at least one layered structure in which a low-density layer formed by aggregates of the plate-shaped primary particles and the fine primary particles, and a high-density layer formed by aggregates of the plate-shaped primary particles are layered; the high-density layer connected with the center section and/or another high-density layer by a high-density section formed inside the low-density layer by aggregates of the plate-shaped primary particles; and the secondary particles having an average particle size within a range 1 µm to 15 µm, and an index [(d90−d10)/average particle size] that indicates a particle size distribution of the secondary particles is 0.65 or less.

2. The transition metal-containing composite hydroxide according to claim 1, wherein the transition metal-containing composite hydroxide has a composition that is expressed by a general formula (A): $Ni_xMn_yCo_zM_t(OH)_{2+a}$ (where x+y+z+t=1, 0.3≤x≤0.95, 0.05≤y≤0.55, 0≤z≤0.4, 0≤t≤0.1, 0≤a≤0.5, and M is at least one additional element selected from among Mg, Ca, Al, Ti, V, Cr, Zr, Nb, Mo, Hf, Ta and W).

3. The transition metal-containing composite hydroxide according to claim 2, wherein the additional element(s) (M) is uniformly distributed inside the secondary particles and/or uniformly coated on a surface of the secondary particles.

4. A manufacturing method of the transition metal-containing composite hydroxide that is a precursor to a positive electrode active material for a non-aqueous electrolyte secondary battery of claim 1, the method comprising forming a reaction aqueous solution by supplying a raw material aqueous solution including at least a transition metal and an aqueous solution including an ammonium ion donor into a reaction tank and performing a crystallization reaction; comprising:

a nucleation process adjusting a pH value of the reaction aqueous solution to a value within a range 12.0 to 14.0 at a reference liquid temperature of 25° C., and generating nuclei; and a particle-growth process controlling a pH value of the reaction aqueous solution including the nuclei that are obtained in the nucleation process to a value that is lower than the pH value of the nucleation process and that is within a range 10.5 to 12.0 at a reference liquid temperature of 25° C., and causing the nuclei to grow;

a reaction atmosphere in the nucleation process and in an initial stage of the particle-growth process being adjusted to be a non-oxidizing atmosphere in which an oxygen concentration is 5% by volume or less;

after the initial stage of the particle-growth process, atmosphere control being performed at least one time in which the reaction atmosphere is switched from the non-oxidizing atmosphere to an oxidizing atmosphere having an oxygen concentration that is greater than 5% by volume by directly introducing oxidizing gas into the reaction aqueous solution while continuing the supply of the raw material aqueous solution, and is further switched from the oxidizing atmosphere to a non-oxidizing atmosphere having an oxygen concentration that is 5% by volume or less by directly introducing inert gas into the reaction aqueous solution while continuing the supply of the raw material aqueous solution.

5. The manufacturing method of the transition metal-containing composite hydroxide according to claim 4, wherein the oxidizing gas and the inert gas are introduced by a diffusing pipe.

6. The manufacturing method of the transition metal-containing composite hydroxide according to claim 4, wherein in the particle-growth process, the total amount of time during which the oxidizing gas is introduces is within a range 1% to 25% with respect to the total time of the particle-growth process.

7. The manufacturing method of the transition metal-containing composite hydroxide according to claim 4, wherein the amount of time of the crystallization reaction in the initial stage of the particle-growth process is within a range 0.5% to 30% with respect to the total time of the particle-growth process.

8. The manufacturing method of the transition metal-containing composite hydroxide according to claim 4, wherein the transition metal-containing composite hydroxide has a composition that is expressed by a general formula (A): $Ni_xMn_yCo_zM_t(OH)_{2+a}$ (where x+y+z+t=1, 0.3≤x≤0.95, 0.05≤y≤0.55, 0≤z≤0.4, 0≤t≤0.1, 0≤a≤0.5, and M is at least one additional element selected from among Mg, Ca, Al, Ti, V, Cr, Zr, Nb, Mo, Hf, Ta and W).

9. The manufacturing method of the transition metal-containing composite hydroxide according to claim 8, further comprising a coating process after the particle-growth process that coats the transition metal-containing composite hydroxide with compounds that include at least part of the additional element(s) (M).

10. A manufacturing method of a positive electrode active material for a non-aqueous electrolyte secondary battery, comprising:

a mixing process forming a lithium mixture by mixing the transition metal-containing composite hydroxide according to claim 1 with a lithium compound; and a calcination process calcining the lithium mixture formed in the mixing process in an oxidizing atmosphere at a temperature within the range 650° C. to 980° C.

11. The manufacturing method of the positive electrode active material for a non-aqueous electrolyte secondary battery according to claim 10, wherein, in the mixing process, the lithium mixture is adjusted so that a ratio of a sum of the number of atoms of metals other than lithium included in the lithium mixture and the number of atoms of lithium is within a range 1:0.95 to 1.5.

12. The manufacturing method of the positive electrode active material for a non-aqueous electrolyte secondary battery according to claim 10, further comprising a heat-treatment process before the mixing process that heat treats the transition metal-containing composite hydroxide at 105° C. to 750° C.

13. The manufacturing method of the positive electrode active material for a non-aqueous electrolyte secondary battery according to claim 10, wherein the positive electrode active material for a non-aqueous electrolyte includes a layered hexagonal crystal type of lithium transition metal-containing composite oxide that is expressed by the general formula (B): $Li_{1+u}Ni_xMn_yCo_zM_tO_2$ (where, −0.05≤u≤0.50, x+y+z+t=1, 0.3≤x≤0.95, 0.05≤y≤0.55, 0≤z≤0.4, 0≤t≤0.1, and M is at least one additional element selected from among Mg, Ca, Al, Ti, V, Cr, Zr, Nb, Mo, Hf, Ta and W).

* * * * *